(12) United States Patent
Benson et al.

(10) Patent No.: US 6,746,517 B2
(45) Date of Patent: Jun. 8, 2004

(54) FILTER STRUCTURE WITH TWO OR MORE LAYERS OF FINE FIBER HAVING EXTENDED USEFUL SERVICE LIFE

(75) Inventors: James D. Benson, Bloomington, MN (US); Douglas G. Crofoot, Burnsville, MN (US); Mark A. Gogins, Roseville, MN (US); Thomas M. Weik, Deephaven, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 09/871,156

(22) Filed: May 31, 2001

(65) Prior Publication Data

US 2002/0046656 A1 Apr. 25, 2002

Related U.S. Application Data

(60) Provisional application No. 60/230,138, filed on Sep. 5, 2000.

(51) Int. Cl.$^7$ ............................ B01D 39/16; B01D 46/00
(52) U.S. Cl. ............................ 95/273; 55/486; 55/487; 55/527; 55/528
(58) Field of Search .................. 55/482, 486, 487, 55/382, 527, DIG. 2, 528; 15/347; 442/36; 95/273

(56) References Cited

U.S. PATENT DOCUMENTS

| 567,399 | A | 9/1896 | Laws |
| 2,835,341 | A | 5/1958 | Parker, Jr. |
| 2,980,204 | A | 4/1961 | Jordan |
| 3,102,793 | A | 9/1963 | Alban |
| 3,236,679 | A | 2/1966 | Spiller et al. |
| 3,251,475 | A | 5/1966 | Till et al. |

(List continued on next page.)

FOREIGN PATENT DOCUMENTS

| DE | 299 07 699 U1 | 9/1999 |
| EP | 0 489 395 A1 | 6/1992 |
| EP | 0 811 412 A1 | 12/1997 |
| EP | 1 048 335 A1 | 11/2000 |
| GB | 745030 | 2/1956 |
| GB | 969327 | 8/1960 |
| JP | 05195322 A2 | 8/1993 |
| JP | 05239778 A2 | 9/1993 |
| JP | 06057530 A2 | 3/1994 |
| JP | 06057531 A2 | 3/1994 |
| JP | 06264301 A2 | 9/1994 |
| WO | WO 94/18364 | 8/1994 |
| WO | WO 99/16532 | 4/1999 |
| WO | WO 00/01737 | 1/2000 |

OTHER PUBLICATIONS

ASTM F1215 89–13 Standard Test Method for Determining the Initial Efficiency of a Flatsheet Filter Medium in an Airflow Using Latex Spheres, American Society for Testing and Materials, pp. 1–9.

Adanur, S. et al., "Recovery and Reuse of Waste PVC Coated Fabrics. Part 1: Experimental Procedures and Separation of Fabric Components", *Jour. of Coated Fabrics*, vol. 28, pp. 37–55 (Jul. 1998).

(List continued on next page.)

*Primary Examiner*—Duane Smith
*Assistant Examiner*—Jason M. Greene
(74) *Attorney, Agent, or Firm*—Merchant & Gould P.C.

(57) ABSTRACT

The use of fine fiber or fiber having a fiber diameter of about 0.0001 to 0.5 microns has become an important design tool for filter media. Common filter media have been prepared with a layer of fine fiber on typically formed the upstream or intake side of the media structure. The fine fiber increases the efficiency of filtration by trapping small particles which increases the overall particulate filtration efficiency of the structure. Improved fine fiber structures have been developed in which a controlled amount of fine fiber is placed on both sides of the media to result in an improvement in filter efficiency but a substantial improvement in lifetime.

41 Claims, 6 Drawing Sheets

U.S. PATENT DOCUMENTS

| | | |
|---|---|---|
| 3,258,900 A | 7/1966 | Harms |
| 3,360,598 A | 12/1967 | Earnhart |
| 3,565,979 A | 2/1971 | Palmer |
| 3,570,675 A | 3/1971 | Pall et al. |
| 3,591,010 A | 7/1971 | Pall et al. |
| 3,689,608 A | 9/1972 | Hollberg et al. |
| 3,745,748 A | 7/1973 | Goldfield et al. |
| 3,755,527 A | 8/1973 | Keller et al. |
| 3,772,136 A | 11/1973 | Workman |
| 3,825,380 A | 7/1974 | Harding et al. |
| 3,839,529 A | 10/1974 | Serres et al. |
| 3,851,023 A | 11/1974 | Brethauer et al. |
| 3,888,610 A | 6/1975 | Brackmann et al. |
| 3,994,258 A | 11/1976 | Simm |
| 4,011,067 A | 3/1977 | Carey, Jr. |
| 4,020,230 A | 4/1977 | Mahoney et al. |
| 4,032,688 A | 6/1977 | Pall |
| 4,070,519 A | 1/1978 | Lefkowitz et al. |
| 4,143,196 A | 3/1979 | Simm et al. |
| 4,148,595 A | 4/1979 | Bednarz |
| 4,210,615 A | 7/1980 | Engler et al. |
| 4,215,682 A | 8/1980 | Kubik et al. |
| 4,223,101 A | 9/1980 | Fine et al. |
| 4,230,650 A | 10/1980 | Guignard |
| 4,278,623 A | 7/1981 | Niegisch |
| 4,290,987 A | 9/1981 | Soehngen et al. |
| 4,323,525 A | 4/1982 | Bornat |
| 4,340,479 A | 7/1982 | Pall |
| 4,370,290 A | 1/1983 | Makino et al. |
| 4,468,428 A | 8/1984 | Early et al. |
| 4,469,606 A | 9/1984 | Reid et al. |
| 4,476,186 A | 10/1984 | Kato et al. |
| 4,594,162 A | 6/1986 | Berger |
| 4,650,506 A | 3/1987 | Barris et al. |
| 4,689,186 A | 8/1987 | Bornat |
| 4,824,451 A | 4/1989 | Vogt et al. |
| 4,826,519 A | 5/1989 | Miyagi et al. |
| 4,842,505 A | 6/1989 | Annis et al. |
| 4,842,924 A | 6/1989 | Farris et al. |
| 4,874,399 A | 10/1989 | Reed et al. |
| 4,900,671 A | 2/1990 | Pokora et al. |
| 4,915,886 A | 4/1990 | Repetti et al. |
| 4,917,942 A | 4/1990 | Winters |
| 4,929,502 A | 5/1990 | Giglia |
| 4,992,515 A | 2/1991 | Ballard |
| 5,082,476 A | 1/1992 | Kahlbaugh et al. |
| 5,104,537 A | 4/1992 | Stifelman et al. |
| 5,166,246 A | 11/1992 | Gallucci et al. |
| 5,176,952 A | 1/1993 | Joseph et al. |
| 5,198,294 A | 3/1993 | Masuda et al. |
| 5,203,201 A | 4/1993 | Gogins |
| 5,238,735 A | 8/1993 | Nagou et al. |
| 5,269,925 A | 12/1993 | Broadhurst |
| 5,273,565 A | 12/1993 | Milligan et al. |
| 5,306,534 A * | 4/1994 | Bosses ................. 55/382 |
| 5,358,638 A | 10/1994 | Gershenson |
| 5,364,456 A | 11/1994 | Kahlbaugh et al. |
| 5,409,513 A * | 4/1995 | Teague et al. ........... 55/528 |
| 5,411,576 A | 5/1995 | Jones et al. |
| 5,437,910 A | 8/1995 | Raabe et al. |
| 5,472,481 A | 12/1995 | Jones et al. |
| 5,496,507 A | 3/1996 | Angadjivand et al. |
| 5,593,768 A | 1/1997 | Gessner |
| 5,597,645 A | 1/1997 | Pike et al. |
| 5,633,746 A * | 5/1997 | Sekiya et al. ........... 359/280 |
| 5,672,188 A * | 9/1997 | Choi ........................ 55/486 |
| 5,672,399 A * | 9/1997 | Kahlbaugh et al. ......... 55/527 |
| 5,763,078 A | 6/1998 | Braun et al. |
| 5,800,586 A | 9/1998 | Cusick et al. |
| 5,820,646 A | 10/1998 | Gillingham et al. |
| 5,843,442 A | 12/1998 | Soule et al. |
| 5,853,442 A | 12/1998 | Glen et al. |
| 5,863,701 A | 1/1999 | Mertesdorf |
| 5,895,510 A | 4/1999 | Butler et al. |
| 5,908,598 A | 6/1999 | Rousseau et al. |
| 5,919,847 A | 7/1999 | Rousseau et al. |
| 5,948,344 A | 9/1999 | Cusick et al. |
| 5,954,849 A | 9/1999 | Berkhoel et al. |
| 5,968,635 A | 10/1999 | Rousseau et al. |
| 5,976,208 A | 11/1999 | Rousseau et al. |
| 5,980,755 A | 11/1999 | Roberts et al. |
| 5,980,759 A | 11/1999 | Proulx et al. |
| 5,993,501 A * | 11/1999 | Cusick et al. .............. 55/486 |
| 5,993,580 A | 11/1999 | Nakayama et al. |
| 6,002,017 A | 12/1999 | Rousseau et al. |
| 6,032,807 A | 3/2000 | Sternberg et al. |
| 6,048,661 A | 4/2000 | Nishi et al. |
| D425,189 S | 5/2000 | Gillingham et al. |
| 6,068,799 A | 5/2000 | Rousseau et al. |
| 6,090,173 A | 7/2000 | Johnson et al. |
| 6,110,249 A | 8/2000 | Medcalf et al. |
| 6,123,751 A | 9/2000 | Nelson et al. |
| 6,156,086 A * | 12/2000 | Zhang ..................... 55/486 |
| 6,171,684 B1 | 1/2001 | Kahlbaugh et al. |
| 6,183,536 B1 * | 2/2001 | Schultink et al. .......... 55/486 |
| 6,193,773 B1 | 2/2001 | Schlor et al. |
| 6,322,604 B1 * | 11/2001 | Midkiff .................... 55/486 |
| 6,355,079 B1 * | 3/2002 | Sorvari et al. ............. 55/486 |
| 6,395,046 B1 | 5/2002 | Emig et al. |

OTHER PUBLICATIONS

Angelo, R. et al., "Preparation and Characterization of Selectively Isotopically Labeled Nylon 66 Polymers", *Macromolecules*, vol. 22, pp. 117–121 (1989).

Basutkar, P. et al., "Synthesis and Characterization of Phenylated Aromatic Poly(amide–amides)s", *Jour. of Applied Polymer Science*, vol. 68, pp. 1523–1530 (1998).

Baumgarten, P., "Electrostatic Spinning of Acrylic Microfibers", *Jour. of Colloid and Interface Science* vol. 36, No. 1, No. 1, 9 pages (May 1971).

Benavente, J. et al., "Electrical Properties of Modified Aromatic Polyamide Membranes", *Separation Science and Technology*, vol. 32, No. 13, pp. 2189–2199 (1997).

Bognitzki, M. et al., "Polymer, Metal and Hybrid Nano– and Mesotubes by Coating of Degradable Polymer Template Fibers (Turf–process)", Philipps–University Marburg, Department of Chemistry, Mainz, Germany, pp. 45 and 46 (Date Unknown).

Bognitzki, M. et al., "Submicrometer Shaped Polylactide Fibers by Electrospinning", Philipps–University Marburg, Department of Chemistry, Mainz, Germany, pp. 115 and 116 (Date Unknown).

Chun, I. et al., "Carbon Nanofibers from Polyacrylonitrile and Mesophase Pitch" *Jour. of Advanced Materials*, vol. 31, No. 1, pp. 36–41 (Jan. 1999).

Dietzel, J. et al., "Generation of Polymer Nanofibers Through Electrospinning", *Army Research Labm Aberdeen Proving Ground, MD 21005–5066*, ARL–TR–1898, pp 1–36 (Jun. 1999).

Dhawan, S. et al., Conducting Fabrics as a Shield Against Electromagnetic Interference (EMI), *Jour. of Coated Fabrics*, vol. 28, pp. 29–36 (Jul. 1998).

Donaldson® Brochure, Ultra–Web® "Premium Quality–High Efficiency Filters", 4 pages (1994).

Donaldson Brochure, Donaldson® Gas Turbine Systems, DZ2000™ Panel Filters with Spider–Web® Filter Media, 4 pages (1997).

Donaldson Brochure, Eon™ Fine Fiber Technology by Donaldson, 6 pages (1999).

Donaldson® Brochure, Tech Topics, "Do Spider–Web Replacement Filters Really 'Cost' Extra? Analysis Shows How Savings from High Performance Far Outweigh a Premium Price", 2 pages (Jul. 1999).

Donaldson® Brochure, Filtration Solutions for Gas Turbines, Generators, and Compressors, "DZ2000 Air Filter Media, The Longer Life, Higher Value Filter Media for Gas Turbine Inlet Air Filter Systems", 4 pages (Dec. 2000).

Doshi, J., "The Electrospinning Process and Applications of Electrospun Fibers", *UMI Dissertation Services* University of Akron, pp. 1–170, including sections (Aug. 1994).

Fang, X., "Application of Electrospinning for Polymers", *UMI Dissertation Services*, University of Akron, pp. 1168, including sections (Aug. 1997).

Gibson, P. et al., "electrospinning Technology: Direct Application of Tailorable Ultrathin Membranes", Jour. of Coated Fabrics, vol. 28, pp. 63–72 (Jul. 1998).

Giessmann, A. et al., "Multipurpose Production Line for the Coated Textile Industry", *Jour. of Coated Fabrics*, vol. 28, pp. 56–62 (Jul. 1998).

Huang, M. et al., "The Modification of Nylon 6 by a Phenol–Formaldehyde Resin", *Jour. of Applied Polymer Science*, vol. 48, pp. 563–572 (1993).

Huang, T. "Modification of Nylon 6 by Phenol–Containing Polymers",*Jour. of Applied Polymer Science*, vol. 73, pp. 295–300 (1999).

Huang, R. et al., "Crosslinked Blended Poly(vinyl alcohol)/ N–Methylol Nylon–6 Membranes for the Pervaporation Separation of Ethanol–Water Mixtures", *Jour. of Applied Polymer Science*, vol. 70, pp. 317–327 (1998).

Kim, J. et al., "Polybenzimidazole Nanofiber Produced by Electrospinning", *Polymer Engineering And Science*vol. 39, No. 5, pp. 849–854 (May 1999).

Kirichenko, V. et al., "Acceleration of a Free Jet of Low-conducting Liquid in an Electric Field", *Sov. Phys. Dokl*, vol. 35, No. 12, pp. 1018–1020 (Dec. 1990).

Kirichenko, V. et al., "Charge Transfer due to the Electrohydrodynamic Atomization of a Liquid", *Sov. Phys. Dokl.*, vol. 33, No. 8, pp. 564–566 (Aug. 1988).

Kirichenko, V. et al., "Domains of Existence of Free, Stationary Liquid jets in a Strong External Electric Field", *Sov. Phys. Dokl.*, vol. 32, No. 7, pp. 544–547 (Jul. 1987).

Kirichenko, V. et al., "Gas Flow and Filtration Through permeable Channel Walls", *Phys. Dokl.*, vol. 38, No. 4, pp. 139–141 (Apr. 1993).

Kirichenko, v. et al., "Shape of a Free, Stationary Liquid Jet in a Strong Uniform Electric Field", *Sov. Phys. Dokl*, vol. 32, No. 7, pp. 546–547 (Jul. 1987).

Kirichenko, V. et al., "Specific Charge of the Liquid in Electrohydrodynamic Atomization and Microfilament Forming Processes", *Sov. Phys. Dokl*, vol. 35, No. 12, pp. 1015–1020 (Dec. 1990).

Kirichenko, V. et al., "Transverse Splitting of a Liquid Jet in a Strong Electric Field", *Sov. Phys. Dokl.*, vol. 33, No. 9, pp. 653–654 (Sep. 1988).

Mahajan, S. et al., "Fibrillation Behavior of Oriented Tapes of Polyethylene and its Blends. IV", *Jour. of Applied Polymer Science*, vol. 60, pp. 1551–1560 (1996).

Marijnissen, J., "Electrosprays with Applications in Aerosol Technology and Material Synthesis", 1994 International Aerosol Conference Tutorial Sessions, Los Angeles, California, pp. 1–67 (Aug. 29, 1994).

Maslowski, E. et al., "New Processes for Fiber–Like PE Structures",*Fiber World*, pp. 12–14 (Mar. 1987).

National Textile Center, "Electrostatic Spinning and Properties of Ultrafine Fibers", http://www.ntcresearch.org/currently/year8/M98–DO1.htm, last updated May 19, 1999, pp. 1–4.

Ohzawa, Y. et al., "Studies on Dry Spinning. I. Fundamental Equations", *Jour. of Applied Polymer Science*vol. 13, pp. 257–283 (1969).

Ohzawa, Y. et al., "Studies on Dry Spinning. II. Numerical Solutions for Some Polymer–Solvent Systems Based on the Assumption that Drying is Controlled by Boundary–Layer Mass Transfer",*Jour. of Applied Polymer Science*, vol. 14, pp. 1879–1899 (1970).

Petryanov, I. et al., "Adhesion of Finely Dispersed Particles to the Surface of Coating Materials", *Translated from Doklady Akademii Nauk SSSR*, vol. 288, No. 5, pp. 515–551, Original Article submitted Jul. 3, 1985.

SBCCOM–Natick Public Affairs, "Army Teams with Universities to Develop Electrospun Membranes and Fabrics for Soldier Protection", http://www.Natick.army.mil/pao/1998/98–26.htm, last updated 0/27/00, pp. 1–2.

Shambaugh, R., "A Macroscopic View of the Melt–Blowing Process for Producing Microfibers", *Ind. Eng. Chem. Res.*, vol. 27, No. 12, pp. 2363–2372 (1988).

Shepelev, A. et al., "Polymeric Fiber Materials for Fine Cleaning of Gases", *J. Aerosol Sci., Suppl. 1*, vol. 26, pp. 59195920, (1995).

Shieh, J. et al., "Preparation of N–Methylol Nylon–6 membranes for Pervaporation of Ethanol–Water Mixtures",*Department of Chemical Engineering,University of Waterloo, Ontario N2L 3G1, Canada*, pp. 855–863 (Received Jun. 24, 1996).

Sioen, J., "The Coating Company of the Future", *Jour. of Coated Fabrics*, vol. 28, pp. 73–79 (Jul. 1998).

Smith, J., "Cellulose Acetate Fibrets: a Fibrillated Pulp with High Surface Area", *Tappi Journal*, pp. 185–193 (Dec. 1988).

Smith, R. et al., "Phase Behavior and Reaction of Nylon 6/6 in Water at High Temperatures and Pressures", *Jour. of Applied Polymer Science*, vol. 76, pp. 1062–1073 (2000).

"Survey of Soluble Polyamide Patents", RT–2488–R, pp 1–6 (Oct. 14, 1954).

Taylor, G., Viscosity And Molecular Weight of Nylon, "The Relation of the Viscosity of Nylon Solutions in Formic Acid to Molecular Weight as Determined by End–Group Measurements", *Contribution From The Chemical Department, Experimental Station, E.I. Du Pont De Nemours & Company*, pp. 635–637 (Mar. 1947).

Wadsworth, L. et al., "Development of Highly Breathable and Effective Blood/Viral Barrier Laminates of Microporous Films, Staple Fibers and Nonwovens", *Jour. of Coated Fabrics*, vol. 28, pp. 12–28 (Jul. 1998).

Wang, F. et al. "Hydrogen Bonding in Polyamide Toughened Novolac Type Phenolic Resin", *Jour. of Applied Polymer Science* vol. 74, pp. 2283–2289 (1999).

Wang, H. et al., "Synthesis and Properties of Nylon 6 Modified with Various Aromatic Polyamides",*Jour. of Applied Polymer Science*, vol. 68, pp. 1031–1043 (1998).

Wente, V., "Superfine Thermoplastic Fibers", *Industrial And Bio_Chemistry*, Naval Research Laboratory, Washington 25, D.C., vol. 48, No. 8, pp 1342–1346 (Aug. 1986).

Declaration of Doug Crofoot with Exhibits A and B, dated Sep. 10, 2001.

* cited by examiner

FILTER STRUCTURE WITH TWO OR MORE LAYERS OF FINE FIBER HAVING EXTENDED USEFUL SERVICE LIFE

RELATED APPLICATION

This application claims priority under 35 U.S.C. §119(e) to U.S. provisional application serial No. 60/230,138, filed on Sep. 5, 2000 now abandoned, incorporated by reference herein.

FIELD OF THE INVENTION

This disclosure relates to unique filter constructions for filtering fluids including gaseous or liquid streams. In particular, a unique arrangement of filter components is disclosed that can provide substantially increased lifetime for a filter construction while maintaining or improving filter efficiency. Such filters typically comprise fine fiber, a porous substrate layer that can be used in combination with a variety of supports, housings, hardware and other components in a filter structure. A fluid stream passes through the filter to remove unwanted materials such as a particulate material. As the streams pass through the filter, particulates that can be in the form of liquids, solids and mixtures thereof are removed from the mobile fluid streams.

BACKGROUND OF THE INVENTION

In the practice of filtration technology, a fluid stream is typically passed through a filter structure for the purpose of removing a particulate from the stream. Any filter element will be able to remove some proportion of the particulate from the stream during the lifetime of the filter. Filter efficiencies are typically defined as the proportion of the particulate, entrained in the mobile fluid phase, removed by the filter. Filter lifetime is typically considered to be related to the period of time that the pressure drop across the filter remains below a certain predetermined level to permit acceptable operating parameters for the filter and operating equipment. A filter must obtain a sufficient removal efficiency while maintaining a sufficiently low pressure drop to obtain useful performance. A high pressure drop is characteristic of poor operating efficiency for the equipment using the filter.

As is true in many technologies, substantial trade-offs arise in any embodiment of a successful technology. Very often as efficiency increases, pressure drop also increases and lifetime often is substantially reduced. For reasons that are not entirely well defined, the pressure drop across any filter can increase substantially during operations. Filtering streams containing substantial proportions of mist or fog, inorganic aerosol, organic aerosol formed from oils, fats, carbon or other sources, or mixed aqueous inorganic organic aerosol structures often results in reduced useful life. The tightly interlocked nature of efficient fine fiber layers can cause increased pressure drop across the fine fiber layer will substantially and rapidly increase when contacted with such a fluid particulate stream. While these filters are excellent in initial operation, the filter lifetime, not efficiency is often a problem. The filters are adequate for the task but must be replaced. In view of the rapidity that such structures can increase in pressure drop, i.e. have substantially reduced service lifetimes, improvements to such filters are needed.

As is typical in any technological application, the improvement of both filter efficiency and lifetime is a long sought goal for filter manufacturers. In view of this, substantial need exists in the art for filter technology and structures that can obtain increased filter lifetime while maintaining or improving filter efficiency.

BRIEF DESCRIPTION OF THE INVENTION

We have found that a substantially improved filter media, filter structure, and filtration process can be obtained by using a filter media having a controlled amount of fine fiber in two or more layers in a media substrate or structure. By forming the fiber in reduced amounts in two or more layers filter efficiency can be maintained or increased while lifetime can be increased. In a preferred embodiment, a first layer of fine fiber is placed on an upstream surface of the substrate, then a second layer is formed as a second surface typically downstream. The efficiency of the upstream and the downstream layers can be intentionally selected to be different. The downstream layer can have an efficiency greater than the upstream layer. The layers are placed such that the filtered fluid passes through two layers. The media can be formed into a filter structure in a variety of filter structure geometries and formats. The double sided layer of fine fiber maintains or increases the efficiency of filtration but substantially increases the lifetime of the filter. We have surprisingly found that by placing an amount of fine fiber that results in an efficiency less than about 90% in a first layer on a side of a substrate combined with one or more second layers, in a filter structure, obtains a filter having greater than 90% overall efficiency and extended lifetime. We have found that by placing an amount of fine fiber in any one layer that ranges from about 50% to less than about 90% efficiency provides these unique advantages, preferably we have found that the amount of fine fiber placed on the substrate should range from about 65% to about 85% efficiency.

We believe one mechanism by which the fine fiber layer obtains a substantially increased pressure drop results from the "filming over" phenomenon. As filtered particulate materials interact with the fine fiber and become trapped in the fine fiber mesh or web, the particulates, particularly if they are low volatility liquids, can form a liquid film completely filling an opening pore or space in the fine fiber mesh. As these areas in the mesh are filled with fluid, the pressure across the filter rapidly increases. The filming over property can also result from interaction between particulates and the fine fiber but simply results from the filling of the unoccupied space within the fiber web causing pressure increase. Having a layer on the downstream side that is greater in efficiency than the upstream side, by more than 3% preferably 5% or more, increases overall efficiency but does not reduce lifetime because the upstream layer and the substrate remove entrained particulate and reduce the tendency of the downstream fine fiber to plugging. One measure of defining lifetime can indicate that the filter structure has completed its lifetime when the pressure drop across the filter increases to about 3 inches of water or more at a test condition of 10 ft/min of flowing medium.

The invention relates to polymeric compositions in the form of fine fiber such as microfibers, nanofibers, in the form of fiber webs, or fibrous mats used in a unique improved filter structure. The polymeric materials of the invention comprise a composition that has physical properties that provide improved efficiency and service lifetime in the unique filter structure. The polymeric materials of the invention are compositions that have physical properties that can also permit the polymeric material, in a variety of physical shapes or forms, to have resistance to the degradative effects of humidity, heat, air flow, chemicals and mechanical stress or impact while maintaining effective filtration during use.

In typical applications, fine fiber is placed on the substrate, the fine fiber layer comprises a fine fiber having a diameter of about 0.0001 to 5 microns, preferably about 0.0001 to about 0.5 micron, most preferably about 0.001 to about 0.3 micron formed in a layer that has a layer thickness of less than about 5 microns, preferably about 0.1 to 3 microns, often from about 0.5 to about 2 microns. Each fine fiber layer comprises an interlocking randomly oriented mesh of fibers that results in a mesh having a relatively broad distribution of pore size openings. For the purpose of this patent application, the term "pore" refers to a passage or opening in the web through the fine fiber layer that is formed from a periphery of 2 or more fine fibers. The pore can result from the intermingling of a variety or large number of fine fibers creating or forming openings of a size that can be effective in traping particulate materials. While any fine fiber layer can have openings of a variety of sizes, the fine fiber layers of the invention have a substantial number of pores of a size that range from very small, i.e. about 0.001 to about 5 microns, but often range between about 0.5 and 3 microns for effective filtering. Preferably, in the structures of the invention, the pores are formed with openings having a open pore size less than 3 microns, often less than 1 micron in the form of an interlocking mesh having openings in which a major dimension of the opening is less than the diameter of the particle typically removed from the fluid passing through the filter. We have found that the tendency of fine fiber layers to obtain an increased pressure drop or to film over can be minimized by reducing the fine fiber coverage on opposite sides of a substrate layer. By placing a reduced amount of fine fiber on both sides of the substrate, the tendency of the fine fiber layers to have smaller easily closed pores as a result of filtering operations with liquid substances is substantially reduced. We believe this reduction results from a somewhat larger pore size in the reduced layer structure, however, the reduced increase in pressure can also result from reduced surface area of the fiber layer. In other words, for example, an improved filter structure can be manufactured by modifying a filter structure having a single fine fiber layer on one side of a substrate displaying an average efficiency of about 90% into a filter structure having two fiber layers that have an efficiency of less than 80%. While the first single layer fiber structure will permit about 10% of the particulate (90% efficient) to pass through the layer, a single efficient layer will have an enhanced tendency to experience quick pressure drop increase. By forming two layers having an efficiency of about, for example, 75%, a filter having an overall efficiency of about 87.5% can result with substantially reduced tendency to an increased pressure drop because of the reduced amount of fiber in the fine fiber layer.

The combination of two layers of fine fiber on opposite sides of a planar media layer, each layer having a reduced efficiency, provides across the entire layered structure, a substantially high efficiency. Surprisingly, this combination of two layers of fine fiber on opposite sides of a planar media layer displays an extended lifetime due to a reduced tendency to plug or film. By distributing the filter particulate throughout the layers of the construct, we believe that any undesired increase in pressure during the lifetime of the filter can be reduced since the filtered particulate does not reside in a relatively narrow portion of the fine fiber structure. We believe it is a surprise that the layered structure distributes the fine fiber throughout the layers, thus substantially improving and extending the time the filter maintains a pressure drop less than the designed maximum pressure drop. Such a distribution of fine fiber also distributes Filter constructions have obtained a variety of physical formats. Filters have been developed into planar sheet-like filter barriers, pleated panels, cylindrical or oval elements, elements formed within cylindrical cartridges, corrugated elements and others. Each of these filter formats can be constructed and arranged in a variety of known technologies. Any filter format can be used that results in the filtered media passing twice through a fine fiber layer.

The media in the filter element or structure can be treated with a fine fiber, for the purpose of this invention, the term "fine fiber" indicates a fiber having a fiber size or diameter of 0.0001 to 5 microns or less often 0.001 to 0.5 microns and, in some instances, substantially submicron diameters. A variety of methods can be utilized for the manufacture and application of fine fiber to the media. Kahlbaugh et al., U.S. Pat. No. 5,423,892; McLead, U.S. Pat. No. 3,878,014; Prentice, U.S. Pat. No. 3,676,242; Lohkamp et al., U.S. Pat. No. 3,841,953; and Butin et al., U.S. Pat. No. 3,849,241; all of which are incorporated by reference herein, disclose a variety of fine fiber technologies.

The conventional filter construction involves the application of fine fiber to the substrate in a single layer in a substantially complete coverage of the media. Sufficient fine fiber is typically used in the fine fiber layer such that the resulting media construction has an initial efficiency of greater than 50%, preferably greater than 80% (on an average basis) with no individual construction having an efficiency less than 30% (the efficiency test is ASTM 1215 89 using monodisperse 0.78 micron polystyrene latex particulate at 20 ft-min$^{-1}$). This efficiency test generally measures the effectiveness of the test substrate to remove from a moving air stream the recited particulate that is moving at the recited rate. The efficiency is expressed as a percent relating to the percent of the total particles tested that is removed by the filter. This test method measures the initial efficiency of a flatsheet filter medium by sampling representative volumes of the upstream and downstream latex aerosol concentrations in a controlled airflow chamber. Filtered and dried air is passed through an atomizer to produce an aerosol containing suspended latex spheres. This aerosol is then passed through a charge neutralizer. The aerosol is then mixed and diluted with additional preconditioned air to produce a stable, neutralized, and dried aerosol of latex spheres to be used in the efficiency test. These test techniques can be used in filter medium testing for aerosol efficiency performance at discrete aerosol particle sizes for both manufacturers and users. It establishes a basis of efficiency comparison of one filter medium to another. For conventional filters, efficiencies less than about 30% on the average or for any particular filter is typically considered unacceptable since such a filter would pass a substantial proportion of the impinging particulate in the mobile fluid phase. Such an amount of particulate, in an engine application, in a gas turbine application or other such applications would pass substantially more particulate to the working parts of the mechanism such that substantial wear or failure of the mechanical device could result.

For the purpose of this patent application, the term "media" refers to a woven or non-woven sheet like substrate, having a thickness of about 0.1 to 5 millimeters and an efficiency of about 5% to 80% often 20% to 80%, made from a natural or synthetic fiber such as cellulose, polyester, nylon, polyolefin, etc.

For the purpose of this patent application, the term "fine fiber" refers to a fiber having a indeterminate length but a width of less than about 5 microns often, less than about 1 micron, formed into a randomly oriented mesh of fiber in a layer that substantially covers a surface of the media. We have found that there is a critical add-on amount of the fine fiber in this application. The fine fiber is placed onto opposing sides of a sheet like substrate an amount obtaining in a single layer of fine fiber an efficiency of about 15% to about 80%. Preferred add-on parameters are as follows:

| Dimensions | Range |
| --- | --- |
| Layer thickness ($\mu$m) | 0.1 to 3 |
| Solidity % | 5 to 40 |
| Density (gm-cm$^{-3}$) | 0.9 to 1.6 (1.2 to 1.4) |
| Basis wt. (gm-cm$^{-2}$) | 4.5 × 10$^{-7}$ to 0.00019 |
| Basis wt. (mg-cm$^{-2}$) | 0.00045 to 0.19 |
| Basis wt. (lb.-3000 ft.$^{-2}$) | 0.0028 to 1.2 |

In one embodiment, a reduced amount but useful add-on amount of fine fiber would be a 0.1 to 1.75 micron thick layer of 5% to 40% solidity fiber layer (95% to 60% void fraction). In this case the basis weight is 0.00045 to 0.11 mg-cm$^{-2}$ or 0.0028 to 0.7 lb.-3000 ft$^{-2}$ (lbs/3000 ft$^{-2}$ is a textile and paper makers standard unit).

In another embodiment, an add-on amount of fine fiber would a 0.75 to 1.25 micron thick layer of 15% to 25% solidity fiber layer (85% to 75% void fraction) In this case the basis weight is 0.010 to 0.05 mg-cm or 0.06 to 0.31 lb.-3000 ft$^{-2}$.

In a final embodiment, the upper end of the add-on amount of fine fiber would be a 1–3 micron thick layer of 10% to 40% solidity fiber layer (90% to 60% void fraction). In this case the basis weight is 0.009 to 0.2 mg-cm$^{-2}$ or 0.055 to 1.2 lb.-3000 ft$^{-2}$.

For the purpose of this patent application, the term "separate layer" is defined to mean that in a filter structure having a substantially sheet-like substrate, that a fluid stream passing through the substrate must first pass through a first fine fiber layer, the substrate and subsequently pass through a second fine fiber layer. These layers can have a variety of filter geometry motifs. The fine fiber layers can in theory be manufactured in one processing step which covers the entirety of both surfaces of a two sided sheet-like substrate resulting in two separate fine fiber layers formed in the entirety on opposing sides of the substrate. In most applications, we envision that a first fine fiber layer will be formed on a substrate side and the substrate will then be passed again through the fine fiber generating step to form the second layer.

For the purpose of this patent application, the term "fine fiber layer pore size or fine fiber web pore size" refers to a space formed between the intermingled fibers in the fine fiber layer.

DETAILED DESCRIPTION OF THE INVENTION

Figure 1:
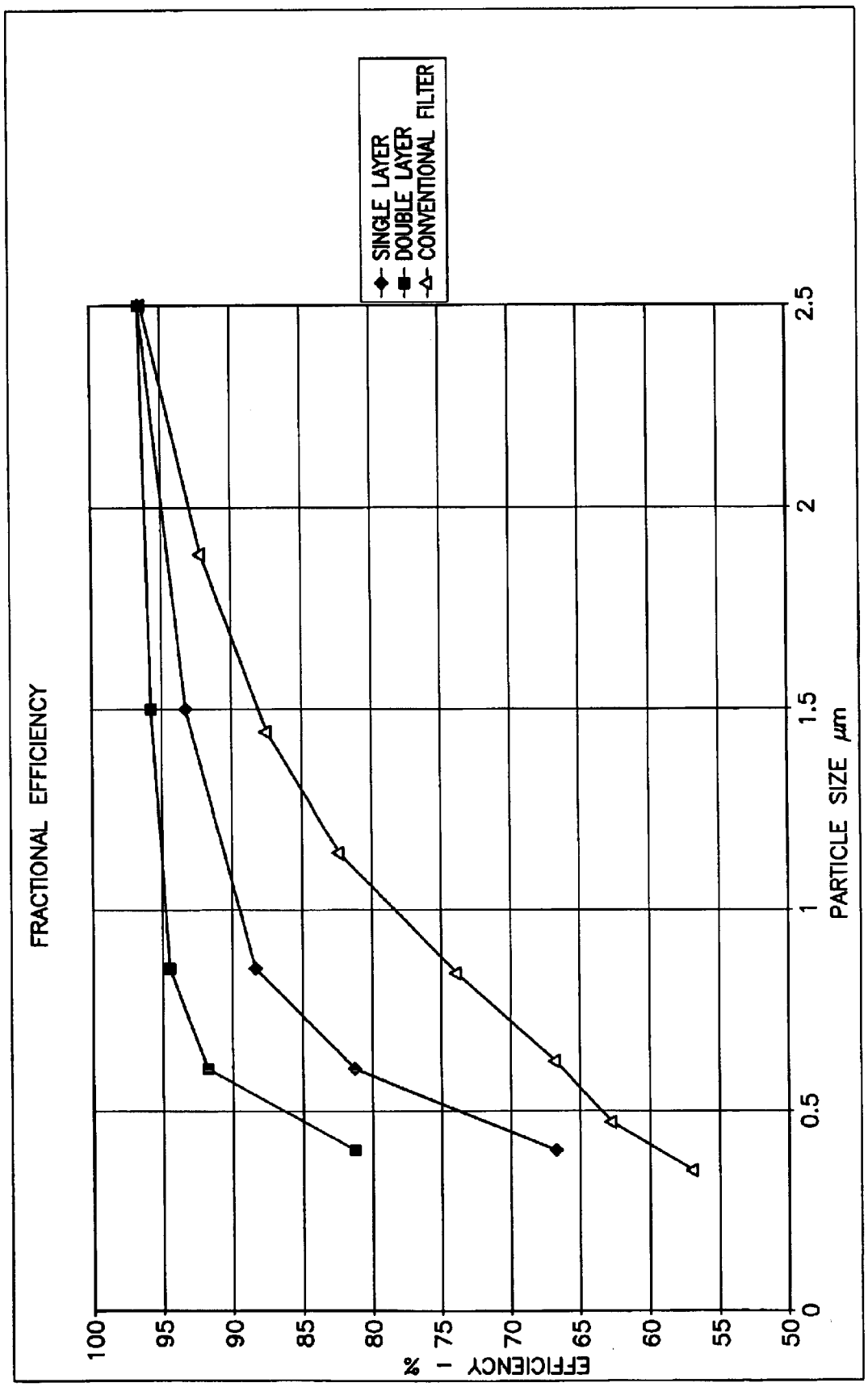
FIG. 1 is a graphical representation of data developed comparing the efficiency of a conventional filter substrate with a single sided fine fiber filter and a dual sided fine fiber filter. Briefly, the data demonstrates the substantial efficiency increase arises in a double-sided fine fiber layer containing filter structure.

The filter construction of the invention involves a substrate layer having a first side of the substrate, a reduced amount of a fine fiber layer when compared to conventional fine fiber layers. The substrate contains on a second side of the substrate, a second reduced amount of the fine fiber layer. The reduced amounts of fine fiber layer have corresponding reduced efficiencies. Accordingly, the efficiency of the fine fiber layers is typically less than about 90% efficient. However, combining two fine fiber layers increases the overall efficiency of the filter structure, while the reduced amount of fiber in each layer reduces the tendency of the layer to substantially increase in pressure drop and increases the useful life of the filter structure. The reduced amount of the fine fiber in both layers results in a substantially increased pore size in the fiber layer and a substantially increased amount of internal volume for passage of the fluid media.

The fine fiber layers can be made by electrospinning fine fibers using conventional techniques.

Microfiber or Fine Fiber Polymeric Materials

The invention provides an improved polymeric material. This polymer has improved physical and chemical stability. The polymer fine fiber are fibers with a diameter of 0.0001 to 5 microns, 0.001 to 0.5 micron or 0.001 to 0.3 micron. Fibers with diameter of up to 5 microns (microfiber) or fiber with diameter of up 0.0001 to 0.3 micron (nanofiber) can be fashioned into useful product formats (e.g., when formed onto a substrate). Nanofiber is a fiber with diameter less than 200 nanometer or 0.2 micron. Microfiber is a fiber with diameter larger than 0.2 micron, but not larger than 10 microns. This fine fiber can be made in the form of an improved multi-layer microfiltration media structure. The fine fiber layers of the invention comprise a random distribution of fine fibers which can be bonded to form an interlocking net.

The fine fiber is formed on a substrate layer. Filtration performance is obtained largely as a result of the fine fiber barrier on the substrate blocking the passage of particulate. Substrate structural properties of stiffness, strength, pleatability are provided by the substrate to which the fine fiber adhered. The fine fiber interlocking networks have as important characteristics, fine fibers in the form of microfibers or nanofibers and relatively small openings, orifices or spaces between the fibers. Such spaces typically range, between fibers, of less than 10 microns, about 0.01 to 5 microns or often about 0.05 to 3 microns, preferably about 0.1 to 2 microns.

The filter products comprise a fine fiber layer formed on a substrate. Fibers from synthetic, natural sources (e.g., polyester and cellulose layers) are thin, appropriate substrate choices. The fine fiber adds less than 5 microns in thickness to the overall filter structure comprising fine fiber plus substrate. In service, the filters can stop incident particulate from passing through the fine fiber layer and can attain substantial surface loadings of trapped particles. The particles comprising dust or other incident particulates rapidly form a dust cake on the fine fiber surface and maintains high initial and overall efficiency of particulate removal. Even with relatively fine contaminants having a particle size of about 0.01 to about 1 micron, the filter media comprising the fine fiber has a very high dust capacity.

The polymer materials as disclosed herein have substantially improved resistance to the undesirable effects of heat, humidity, high flow rates, pore plugging or filming, reverse pulse cleaning, operational abrasion, submicron particulates, cleaning of filters in use and other demanding conditions. The improved microfiber and nanofiber performance is a result of the improved character of the polymeric materials forming the microfiber or nanofiber. Further, the filter media with the correct add-on of the fiber layer of the invention using the improved polymeric materials of the invention provides a number of advantageous features including higher efficiency, unusual useful life, lower flow restriction, high durability (stress related or environmentally related) in the presence of abrasive particulates and a smooth outer surface free of loose fibers or fibrils. The overall structure of the filter materials provides an overall thinner media allowing improved media area per unit volume, reduced velocity through the media, improved media efficiency and reduced flow restrictions.

The fine fiber can be made of a polymer material or a polymer plus additive. One preferred mode of the invention is a polymer blend comprising a first polymer and a second, but different polymer (differing in polymer type, molecular weight or physical property) that is conditioned or treated at elevated temperature. The polymer blend can be reacted and formed into a single chemical specie or can be physically combined into a blended composition by an annealing process. Annealing implies a physical change, like crystallinity, stress relaxation or orientation. Preferred materials are chemically reacted into a single polymeric specie such that a Differential Scanning Calorimeter analysis reveals a single polymeric material. Such a material, when combined with a preferred additive material, can form a surface coating of the additive on the microfiber that provides oleophobicity, hydrophobicity or other associated improved stability when contacted with high temperature, high humidity and difficult operating conditions. The fine fiber of the class of materials can have a diameter of about 0.01 to 5 microns. Such microfibers can have a smooth surface comprising a discrete layer of the additive material or an outer coating of the additive material that is partly solubilized or alloyed in the polymer surface, or both. Preferred materials for use in the blended polymeric systems include nylon 6; nylon 66; nylon 6-10; nylon (6-66-610) copolymers and other linear generally aliphatic nylon compositions. A preferred nylon copolymer resin (SVP-651) was analyzed for molecular weight by the end group titration. (J. E. Walz and G. B. Taylor, determination of the molecular weight of nylon, Anal. Chem. Vol. 19, Number 7, pp 448–450 (1947). A number average molecular weight ($M_n$) was between 21,500 and 24,800. The composition was estimated by the phase diagram of melt temperature of three component nylon, nylon 6 about 45%, nylon 66 about 20% and nylon 610 about 25%. (Page 286, Nylon Plastics Handbook, Melvin Kohan ed. Hanser Publisher, New York (1995)).

Reported physical properties of SVP 651 resin are:

| Property | ASTM Method | Units | Typical Value |
|---|---|---|---|
| Specific Gravity | D-792 | — | 1.08 |
| Water Absorption (24 hr immersion) | D-570 | % | 2.5 |
| Hardness | D-240 | Shore D | 65 |
| Melting Point | DSC | ° C.(° F.) | 154 (309) |
| Tensile Strength @ Yield | D-638 | MPa (kpsi) | 50 (7.3) |
| Elongation at Break | D-638 | % | 350 |
| Flexural Modulus | D-790 | MPa (kpsi) | 180 (26) |
| Volume Resistivity | D-257 | ohm-cm | $10^{12}$ |

A polyvinylalcohol having a hydrolysis degree of from 87 to 99.9+% can be used in such polymer systems. These are preferably cross linked by physical or chemical agents. These PVOH polymers are most preferably crosslinked and combined with substantial quantities of the oleophobic and hydrophobic additive materials.

Another preferred mode of the invention involves a single polymeric material combined with an additive composition to improve fiber lifetime or operational properties. The preferred polymers useful in this aspect of the invention include both condensation polymers and additive polymers such as nylon polymers, polyvinylidene chloride polymers, polyvinylidene fluoride polymers, polyvinylalcohol polymers and, in particular, those listed materials when combined with strongly oleophobic and hydrophobic additives that can result in a microfiber or nanofiber with the additive materials formed in a coating on the fine fiber surface. Again, blends of similar polymers such as a blend of similar nylons, similar polyvinylchloride polymers, blends of polyvinylidene chloride polymers are useful in this invention. Further, polymeric blends or alloys of differing polymers are also contemplated by the invention. In this regard, compatible mixtures of polymers are useful in forming the microfiber materials of the invention. Additive composition such a fluoro-surfactant, a nonionic surfactant, low molecular weight resins (e.g.) tertiary butylphenol resin having a molecular weight of less than about 3000 can be used. The resin is characterized by oligomeric bonding between phenol nuclei in the absence of methylene bridging groups. The positions of the hydroxyl and the tertiary butyl group can be randomly positioned around the rings. Bonding between phenolic nuclei always occurs next to hydroxyl group, not randomly. Similarly, the polymeric material can be combined with an alcohol soluble non-linear polymerized resin formed from bis-phenol A. Such material is similar to the tertiary butylphenol resin described above in that it is formed using oligomeric bonds that directly connect aromatic ring to aromatic ring in the absence of any bridging groups such as alkylene or methylene groups.

A particularly preferred material of the invention comprises a microfiber material having a dimension of about 0.001 to 10 microns. A preferred fiber size range between 0.05 to 0.5 micron. Depending on end use and pulse cleaner or cleaning options, the fiber may be selected from 0.01 to 2 microns fiber, from 0.005 to 5 microns fiber or from 0.1 to 10 microns fiber. Such fibers with the preferred size provide excellent filter activity, ease of back pulse cleaning and other aspects. The highly preferred polymer systems of the invention have adhering characteristic such that when contacted with a cellulosic substrate adheres to the substrate with sufficient strength such that it is securely bonded to the substrate and can resist the delaminating effects of a reverse pulse cleaning technique and other mechanical stresses. In such a mode, the polymer material must stay attached to the substrate while undergoing a pulse clean input that is substantially equal to the typical filtration conditions except in a reverse direction across the filter structure. Such adhesion can arise from solvent effects of fiber formation as the fiber is contacted with the substrate or the post treatment of the fiber on the substrate with heat or pressure. However, polymer characteristics appear to play an important role in determining adhesion, such as specific chemical interactions like hydrogen bonding, contact between polymer and substrate occurring above or below Tg, and the polymer formulation including additives. Polymers plasticized with solvent or steam at the time of adhesion can have increased adhesion.

An important aspect of the invention is the utility of such microfiber or nanofiber materials formed into a filter structure. In such a structure, the fine fiber materials of the invention are formed on and adhered to a filter substrate. Natural fiber and synthetic fiber substrates, like spun bonded fabrics, non-woven fabrics of synthetic fiber and non-wovens made from the blends of cellulosics, synthetic and glass fibers, non-woven and woven glass fabrics, plastic screen like materials both extruded and hole punched, UF and MF membranes of organic polymers can be used. Sheet-like substrate or cellulosic non-woven web can then be formed into a filter structure that is placed in a fluid stream including an air stream or liquid stream for the purpose of removing suspended or entrained particulate from that stream. The shape and structure of the filter material is up to the design engineer. One important parameter of the filter elements after formation is its resistance to the effects of heat, humidity or both. An important aspect of the filter media of the invention is the ability of the filter media to survive contact with warm humid air. In contact with such hot humid air streams, the fine fiber should retain greater than 50% of the fiber unchanged for filtration purposes after being exposed to air having a temperature of 140° F. and 100% relative humidity for 16 hours. One aspect of the filter media of the invention is a test of the ability of the filter media to survive immersion in warm water for a significant period of time. The immersion test can provide valuable information regarding the ability of the fine fiber to survive hot humid conditions and to survive the cleaning of the filter element in aqueous solutions that can contain substantial proportions of strong cleaning surfactants and strong alkalinity materials. Preferably, the fine fiber materials of the invention can survive immersion in hot water while retaining at least 50% of the fine fiber formed on the surface of the substrate as an active filter component. Retention of at least 50% of the fine fiber can maintain substantial fiber efficiency without loss of filtration capacity or increased back pressure. Most preferably retaining at least 75%. The thickness of the typical fine fiber filtration layer ranges from about 0.001 to 5 microns, preferably 0.01 to 3 microns with a fine fiber basis weight ranging from about 0.01 to 240 micrograms-cm$^{-2}$. The fine fiber layers formed on the substrate in the filters of the invention should be substantially uniform in both filtering performance and fiber location. By substantial uniformity, we mean that the fiber has sufficient coverage of the substrate to have at least some measurable filtration efficiency throughout the covered substrate. Adequate filtration can occur with wide variation in fiber add-on. Accordingly, the fine fiber layers can vary in fiber coverage, basis weight, layer thickness or other measurement of fiber add-on and still remain well within the bounds of the invention. Even a relatively small add-on of fine fiber can add efficiency to the overall filter structure.

Fluid streams such as air and gas streams often carry particulate material therein. The removal of some or all of the particulate material from the fluid stream is needed. For example, air intake streams to the cabins of motorized vehicles, air in computer disk drives, HVAC air, clean room ventilation and applications using filter bags, barrier fabrics, woven materials, air to engines for motorized vehicles, or to power generation equipment; gas streams directed to gas turbines; and, air streams to various combustion furnaces, often include particulate material therein. In the case of cabin air filters it is desirable to remove the particulate matter for comfort of the passengers and/or for aesthetics. With respect to air and gas intake streams to engines, gas turbines and combustion furnaces, removal of the particulate material is needed because particulate can cause substantial damage to the internal workings to the various mechanisms involved. In other instances, production gases or off gases from industrial processes or engines may contain particulate material therein. Before such gases can be, or should be, discharged through various downstream equipment to the atmosphere, it may be desirable to obtain a substantial removal of particulate material from those streams.

A general understanding of some of the basic principles and problems of air filter design can be understood by consideration of the following types of filter media: surface loading media; and, depth media. Each of these types of media has been well studied, and each has been widely utilized. Certain principles relating to them are described, for example, in U.S. Pat. Nos. 5,082,476; 5,238,474; and 5,364,456. The complete disclosures of these three patents are incorporated herein by reference.

The "lifetime" of a filter is typically defined according to a selected limiting pressure drop across the filter. The pressure buildup across the filter defines the lifetime at a defined level for that application or design. Since this buildup of pressure is a result of load, for systems of equal efficiency a longer life is typically directly associated with higher capacity. Efficiency is the propensity of the media to trap, rather than pass, particulates. Typically the more efficient a filter media is at removing particulates from a gas flow stream, in general, the more rapidly the filter media will approach the "lifetime" pressure differential (assuming other variables to be held constant). In this application the term "unchanged for filtration purposes" refers to maintaining sufficient efficiency to remove particulate from the fluid stream as is necessary for the selected application.

Polymeric materials have been fabricated in non-woven and woven fabrics, fibers and microfibers. The polymeric material provides the physical properties required for product stability. These materials should not change significantly in dimension, suffer reduced molecular weight, become less flexible or subject to stress cracking or physically deteriorate in the presence of sunlight, humidity, high temperatures or other negative environmental effects. The invention relates to an improved polymeric material that can maintain physical properties in the face of incident electromagnetic radiation such as environmental light, heat, humidity and other physical challenges.

Polymer materials that can be used in the polymeric compositions of the invention include both addition polymer and condensation polymer materials such as polyolefin, polyacetal, polyamide, polyester, cellulose ether and ester, polyalkylene sulfide, polyarylene oxide, polysulfone, modified polysulfone polymers and mixtures thereof. Preferred materials that fall within these generic classes include polyethylene, polypropylene, poly(vinylchloride), polymethylmethacrylate (and other acrylic resins), polystyrene, and copolymers thereof (including ABA type block copolymers), poly(vinylidene fluoride), poly(vinylidene chloride), polyvinylalcohol in various degrees of hydrolysis (87% to 99.5%) in crosslinked and non-crosslinked forms. Preferred addition polymers tend to be glassy (a Tg greater than room temperature). This is the case for polyvinylchloride and polymethylmethacrylate, polystyrene polymer compositions or alloys or low in crystallinity for polyvinylidene fluoride and polyvinylalcohol materials. One class of polyamide condensation polymers are nylon materials. The term "nylon" is a generic name for all long chain synthetic polyamides. Typically, nylon nomenclature includes a series of numbers such as in nylon-6,6 which indicates that the starting materials are a $C_6$ diamine and a $C_6$ diacid (the first digit indicating a $C_6$ diamine and the second digit indicating a $C_6$ dicarboxylic acid compound). Another nylon can be made by the polycondensation of epsilon ($C_6$) caprolactam (or other $C_{6-12}$ lactams) in the presence of a small amount of water. This reaction forms a nylon-6 (made from a cyclic lactam—also known as episilon—aminocaproic acid) that is a linear polyamide. Further, nylon copolymers are also contemplated. Copolymers can be made by combining various diamine compounds, various diacid compounds and various cyclic lactam structures in a reaction mixture and then forming the nylon with randomly positioned monomeric materials in a polyamide structure. For example, a nylon 6,6-6,10 material is a nylon manufactured from hexamethylene diamine and a $C_6$ and a $C_{10}$ blend of diacids. A nylon 6-6,6-6,10 is a nylon manufactured by copolymerization of epsilonaminocaproic acid, hexamethylene diamine and a blend of a $C_6$ and a $C_{10}$ diacid material.

Block copolymers are also useful in the process of this invention. With such copolymers the choice of solvent swelling agent is important. The selected solvent is such that both blocks were soluble in the solvent. One example is a ABA (styrene-EP-styrene) or AB (styrene-EP) polymer in methylene chloride solvent. If one component is not soluble in the solvent, it will form a gel. Examples of such block copolymers are Kraton® type of poly(styrene-co-butadiene and poly(styrene-co-hydrogenated butadiene(ethylene-co-propylene), Pebax® type of e-caprolactam-co-ethylene oxide, Sympatex® polyester-co-ethylene oxide and polyurethanes of ethylene oxide and isocyanates.

Addition polymers like polyvinylidene fluoride, syndiotactic polystyrene, copolymer of vinylidene fluoride and hexafluoropropylene, polyvinyl alcohol, polyvinyl acetate, amorphous addition polymers, such as poly(acrylonitrile) and its copolymers with acrylic acid and methacrylates, polystyrene, poly(vinyl chloride) and its various copolymers, poly(methyl methacrylate) and its various copolymers, can be solution spun with relative ease because they are soluble at low pressures and temperatures. However, highly crystalline polymer like polyethylene and polypropylene require high temperature, high pressure solvent if they are to be solution spun. Therefore, solution spinning of the polyethylene and polypropylene is very difficult. Electrostatic solution spinning is one method of making nanofibers and microfiber.

We have also found a substantial advantage to forming polymeric compositions comprising two or more polymeric materials in polymer admixture, alloy format or in a crosslinked chemically bonded structure. We believe such polymer compositions improve physical properties by changing polymer attributes such as improving polymer chain flexibility or chain mobility, increasing overall molecular weight and providing reinforcement through the formation of networks of polymeric materials.

In one embodiment of this concept, two related polymer materials can be blended for beneficial properties. For example, a high molecular weight polyvinylchloride can be blended with a low molecular weight polyvinylchloride. Similarly, a high molecular weight nylon material can be blended with a low molecular weight nylon material. Further, differing species of a general polymeric genus can be blended. For example, a high molecular weight styrene material can be blended with a low molecular weight, high impact polystyrene. A Nylon-6 material can be blended with a nylon copolymer such as a Nylon-6; 6,6; 6,10 copolymer. Further, a polyvinylalcohol having a low degree of hydrolysis such as a 87% hydrolyzed polyvinylalcohol can be blended with a fully or superhydrolyzed polyvinylalcohol having a degree of hydrolysis between 98 and 99.9% and higher. All of these materials in admixture can be crosslinked using appropriate crosslinking mechanisms. Nylons can be crosslinked using crosslinking agents that are reactive with the nitrogen atom in the amide linkage. Polyvinylalcohol materials can be crosslinked using hydroxyl reactive materials such as monoaldehydes, such as formaldehyde, ureas, melamine-formaldehyde resin and its analogues, boric acids and other inorganic compounds. dialdehydes, diacids, urethanes, epoxies and other known crosslinking agents. Crosslinking technology is a well known and understood phenomenon in which a crosslinking reagent reacts and forms covalent bonds between polymer chains to substantially improve molecular weight, chemical resistance, overall strength and resistance to mechanical degradation.

We have found that additive materials can significantly improve the properties of the polymer materials in the form of a fine fiber. The resistance to the effects of heat, humidity, impact, mechanical stress and other negative environmental effect can be substantially improved by the presence of additive materials. We have found that while processing the microfiber materials of the invention, that the additive materials can improve the oleophobic character, the hydrophobic character and can appear to aid in improving the chemical stability of the materials. We believe that the fine fibers of the invention in the form of a microfiber are improved by the presence of these oleophobic and hydrophobic additives as these additives form a protective layer coating, ablative surface or penetrate the surface to some depth to improve the nature of the polymeric material. We believe the important characteristics of these materials are the presence of a strongly hydrophobic group that can preferably also have oleophobic character. Strongly hydrophobic groups include fluorocarbon groups, hydrophobic hydrocarbon surfactants or blocks and substantially hydrocarbon oligomeric compositions. These materials are manufactured in compositions that have a portion of the molecule that tends to be compatible with the polymer material affording typically a physical bond or association with the polymer while the strongly hydrophobic or oleophobic group, as a result of the association of the additive with the polymer, forms a protective surface layer that resides on the surface or becomes alloyed with or mixed with the polymer surface layers. The additive can be used at an amount of 1% to 25% by weight total on fiber. For 0.2-micron fiber with 10% additive level, the surface thickness is calculated to be around 50 Å, if the additive has migrated toward the surface. Migration is believed to occur due to the incompatible nature of the oleophobic or hydrophobic groups in the bulk material. A 50 Å thickness appears to be reasonable thickness for protective coating. For 0.05-micron diameter fiber, 50 Å thickness corresponds to 20% mass. For 2 microns thickness fiber, 50 Å thickness corresponds to 2% mass. Preferably the additive materials are used at an amount of about 2 to 25 wt. %. Useful surface thickness can range from 10 Å to 150 Å.

Oligomeric additives that can be used in combination with the polymer materials of the invention include oligomers having a molecular weight of about 500 to about 5000, preferably about 500 to about 3000 including fluorochemicals, nonionic surfactants and low molecular weight resins or oligomers. Fluoro-organic wetting agents useful in this invention are organic molecules represented by the formula $$R_f\text{—G}$$

wherein $R_f$ is a fluoroaliphatic radical and G is a group which contains at least one hydrophilic group such as cationic, anionic, nonionic, or amphoteric groups. Nonionic materials are preferred. $R_f$ is a fluorinated, monovalent, aliphatic organic radical containing at least two carbon atoms. Preferably, it is a saturated perfluoroaliphatic monovalent organic radical. However, hydrogen or chlorine atoms can be present as substituents on the skeletal chain. While radicals containing a large number of carbon atoms may function adequately, compounds containing not more than about 20 carbon atoms are preferred since large radicals usually represent a less efficient utilization of fluorine than is possible with shorter skeletal chains. Preferably, $R_f$ contains about 2 to 8 carbon atoms.

The cationic groups that are usable in the fluoro-organic agents employed in this invention may include an amine or a quaternary ammonium cationic group which can be oxygen-free (e.g., —NH$_2$) or oxygen-containing (e.g., amine oxides). Such amine and quaternary ammonium cationic hydrophilic groups can have formulas such as —NH$_2$, —(NH$_3$)X, —(NH(R$^2$)$_2$)X, —(NH(R$^2$)$_3$)X, or —N(R$_2$)$_2$→O, where x is an anionic counterion such as halide, hydroxide, sulfate, bisulfate, or carboxylate, R$^2$ is H or C$_{1-18}$ alkyl group, and each R$^2$ can be the same as or different from other R$^2$ groups. Preferably, R$^2$ is H or a C$_{1-16}$ alkyl group and X is halide, hydroxide, or bisulfate.

The anionic groups which are usable in the fluoro-organic wetting agents employed in this invention include groups which by ionization can become radicals of anions. The anionic groups may have formulas such as —COOM, —SO$_3$M, —OSO$_3$M, —PO$_3$HM, —OPO$_3$M$_2$, or —OPO$_3$HM, where M is H, a metal ion, (NR$^1_4$)$^+$, or (SR$^1_4$)$^+$, where each R$^1$ is independently H or substituted or unsubstituted C$_1$–C$_6$ alkyl. Preferably M is Na$^+$ or K$^+$. The preferred anionic groups of the fluoro-organo wetting agents used in this invention have the formula —COOM or —SO$_3$M. Included within the group of anionic fluoro-organic wetting agents are anionic polymeric materials typically manufactured from ethylenically unsaturated carboxylic mono- and diacid monomers having pendent fluorocarbon groups appended thereto. Such materials include surfactants obtained from 3M Corporation known as FC-430 and FC-431.

The amphoteric groups which are usable in the fluoro-organic wetting agent employed in this invention include groups which contain at least one cationic group as defined above and at least one anionic group as defined above.

The nonionic groups which are usable in the fluoro-organic wetting agents employed in this invention include groups which are hydrophilic but which under pH conditions of normal agronomic use are not ionized. The nonionic groups may have formulas such as —O(CH$_2$CH$_2$)xOH where x is greater than 1, —SO$_2$NH$_2$, —SO$_2$NHCH$_2$CH$_2$OH, —SO$_2$N(CH$_2$CH$_2$H)$_2$, —CONH$_2$, —CONHCH$_2$CH$_2$OH, or —CON(CH$_2$CH$_2$OH)$_2$. Examples of such materials include materials of the following structure:

$$F(CF_2CF_2)_n\text{—}CH_2CH_2O\text{—}(CH_2CH_2O)_m\text{—}H$$

wherein n is 2 to 8 and m is 0 to 20.

Other fluoro-organic wetting agents include those cationic fluorochemicals described, for example in U.S. Pat. Nos. 2,764,602; 2,764,603; 3,147,064 and 4,069,158. Such amphoteric fluoro-organic wetting agents include those amphoteric fluorochemicals described, for example, in U.S. Pat. Nos. 2,764,602; 4,042,522; 4,069,158; 4,069,244; 4,090,967; 4,161,590 and 4,161,602. Such anionic fluoro-organic wetting agents include those anionic fluorochemicals described, for example, in U.S. Pat. Nos. 2,803,656; 3,255,131; 3,450,755 and 4,090,967.

Examples of such materials are duPont Zonyl FSN and duPont Zonyl FSO nonionic surfactants. Another aspect of additives that can be used in the polymers of the invention include low molecular weight fluorocarbon acrylate materials such as 3M's Scotchgard material having the general structure:

$$CF_3(CX_2)_n\text{—acrylate}$$

wherein X is —F or —CF$_3$ and n is 1 to 7.

Further, nonionic hydrocarbon surfactants including lower alcohol ethoxylates, fatty acid ethoxylates, nonylphenol ethoxylates, etc. can also be used as additive materials for the invention. Examples of these materials include Triton X-100 and Triton N-101.

A useful material for use as an additive material in the compositions of the invention are tertiary butylphenol oligomers. Such materials tend to be relatively low molecular weight aromatic phenolic resins. Such resins are phenolic polymers prepared by enzymatic oxidative coupling. The absence of methylene bridges result in unique chemical and physical stability. These phenolic resins can be crosslinked with various amines and epoxies and are compatible with a variety of polymer materials. These materials are generally exemplified by the following structural formulas which are characterized by phenolic materials in a repeating motif in the absence of methylene bridge groups having phenolic and aromatic groups.

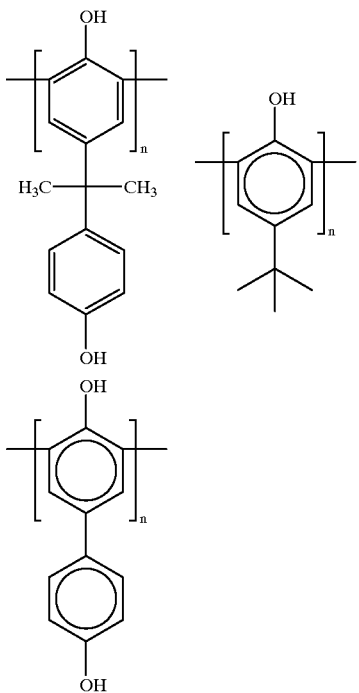

wherein n is 2 to 20. Examples of these phenolic materials include Enzo-BPA, Enzo-BPA/phenol, Enzo-TBP, Enzo-COP and other related phenolics were obtained from Enzymol International Inc., Columbus, Ohio.

It should be understood that an extremely wide variety of fibrous filter media exist for different applications. The durable nanofibers and microfibers described in this invention can be added to any of the media. The fibers described in this invention can also be used to substitute for fiber components of these existing media giving the significant advantage of improved performance (improved efficiency and/or reduced pressure drop) due to their small diameter, while exhibiting greater durability.

A filter media construction according to the present invention includes a first layer of permeable coarse fibrous media or substrate having a first surface. A first layer of fine fiber media is secured to the first surface of the first layer of permeable coarse fibrous media and a second layer of fine fiber is secured to the substrate. Preferably the first layer of permeable coarse fibrous material comprises fibers having an average diameter of at least 10 microns, typically and preferably about 12 (or 14) to 30 microns. Also preferably the first and second layer of permeable coarse fibrous material comprises a media having a basis weight of no greater than about 200 grams/meter$^2$, preferably about 0.50 to 150 g/m$^2$, and most preferably at least 8 g/m$^2$. Preferably the first layer of permeable coarse fibrous media is at least 0.0005 inch (12 microns) thick, and typically and preferably is about 0.001 to 0.030 inch (25–800 microns) thick.

In preferred arrangements, the first layer of permeable coarse fibrous material comprises a material which, if evaluated separately from a remainder of the construction by the Frazier permeability test, would exhibit a permeability of at least 1 meter(s)/min, and typically and preferably about 2–900 meters/min (about 0.03–15 m-sec$^{-1}$). Herein when reference is made to efficiency, unless otherwise specified, reference is meant to efficiency when measured according to ASTM-1215-89, with 0.78$\mu$ monodisperse polystyrene spherical particles, at 20 fpm (6.1 meters/min) as described herein.

Preferably the layer of fine fiber material secured to the first surface of the layer of permeable coarse fibrous media is a layer of nano- and microfiber media wherein the fibers have average fiber diameters of no greater than about 2 microns, generally and preferably no greater than about 1 micron, and typically and preferably have fiber diameters smaller than 0.5 micron and within the range of about 0.05 to 0.5 micron. Also, preferably the first layer of fine fiber material secured to the first surface of the first layer of permeable coarse fibrous material has an overall thickness that is no greater than about 30 microns, more preferably no more than 20 microns, most preferably no greater than about 10 microns, and typically and preferably that is within a thickness of about 1–8 times (and more preferably no more than 5 times) the fine fiber average diameter of the layer.

Certain preferred arrangements according to the present invention include filter media as generally defined, in an overall filter construction. Some preferred arrangements for such use comprise the media arranged in a cylindrical, pleated configuration with the pleats extending generally longitudinally, i.e. in the same direction as a longitudinal axis of the cylindrical pattern. For such arrangements, the media may be imbedded in end caps, as with conventional filters. Such arrangements may include upstream liners and downstream liners if desired, for typical conventional purposes.

In some applications, media according to the present invention may be used in conjunction with other types of media, for example conventional media, to improve overall filtering performance or lifetime. For example, media according to the present invention may be laminated to conventional media, be utilized in stack arrangements; or be incorporated (an integral feature) into media structures including one or more regions of conventional media. It may be used upstream of such media, for good load; and/or, it may be used downstream from conventional media, as a high efficiency polishing filter.

Certain arrangements according to the present invention may also be utilized in liquid filter systems, i.e. wherein the particulate material to be filtered is carried in a liquid. Also, certain arrangements according to the present invention may be used in mist collectors, for example arrangements for filtering fine mists from air.

According to the present invention, methods are provided for filtering. The methods generally involve utilization of media as described to advantage, for filtering. As will be seen from the descriptions and examples below, media according to the present invention can be specifically configured and constructed to provide relatively long life in relatively efficient systems, to advantage.

Various filter designs are shown in patents disclosing and claiming various aspects of filter structure and structures used with the filter materials. Engel et al., U.S. Pat. No. 4,720,292, disclose a radial seal design for a filter assembly having a generally cylindrical filter element design, the filter element being sealed by a relatively soft, rubber-like end cap having a cylindrical, radially inwardly facing surface. Kahlbaugh et al., U.S. Pat. No. 5,082,476, disclose a filter design using a depth media comprising a foam substrate with pleated components combined with the microfiber materials of the invention. Stifelman et al., U.S. Pat. No. 5,104,537, relate to a filter structure useful for filtering liquid media. Liquid is entrained into the filter housing, passes through the exterior of the filter into an interior annular core and then returns to active use in the structure. Such filters are highly useful for filtering hydraulic fluids. Engel et al., U.S. Pat. No. 5,613,992, show a typical diesel engine air intake filter structure. The structure obtains air from the external aspect of the housing that may or may not contain entrained moisture. The air passes through the filter while the moisture can pass to the bottom of the housing and can drain from the housing. Gillingham et al., U.S. Pat. No. 5,820,646, disclose a Z filter structure that uses a specific pleated filter design involving plugged passages that require a fluid stream to pass through at least one layer of filter media in a "Z" shaped path to obtain proper filtering performance. The filter media formed into the pleated Z shaped format can contain the fine fiber media of the invention. Glen et al., U.S. Pat. No. 5,853,442, disclose a bag house structure having filter elements that can contain the fine fiber structures of the invention. Berkhoel et al., U.S. Pat. No. 5,954,849, show a dust collector structure useful in processing typically air having large dust loads to filter dust from an air stream after processing a workpiece generates a significant dust load in an environmental air. Lastly, Gillingham, U.S. Design Pat. No. 425,189, discloses a panel filter using the Z filter design.

The media can be a polyester synthetic media, a media made from cellulose, or blends of these types of materials. One example of usable cellulose media is: a basis weight of about 45–55 lbs./3000 ft$^2$ (84.7 g/m$^2$), for example, 48–54 lbs./3000 ft$^2$; a thickness of about 0.005–0.015 in, for example about 0.010 in. (0.25 mm); frazier permeability of about 20–25 ft/min, for example, about 22 ft/min (6.7 m/min); pore size of about 55–65 microns, for example, about 62 microns; wet tensile strength of at least about 7 lbs/in, for example, 8.5 lbs./in (3.9 kg/in); burst strength wet off of the machine of about 15–25 psi, for example, about 23 psi (159 kPa). The cellulose media can be treated with fine fiber, for example, fibers having a size (diameter) of 5 microns or less, and in some instances, submicron. A variety of methods can be utilized for application of the fine fiber to the media, if it is desired to use fine fiber. Some such approaches are characterized, for example, in U.S. Pat. No. 5,423,892, column 32, at lines 48–60. More specifically, such methods are described in U.S. Pat. Nos. 3,878,014; 3,676,242; 3,841,953; and 3,849,241, incorporated herein by reference. Enough fine fiber typically would be applied until the resulting media construction would have the individual test between 50 to 90%, tested according to SAE J726C, using SAE fine dust, and an overall efficiency of greater than 90%.

Example of usable filter constructions are described in U.S. Pat. No. 5,820,646, which patent is incorporated by reference herein. In another example embodiment the fluted construction (not shown) includes tapered flutes. By "tapered," it is meant that the flutes enlarge along their length such that the downstream opening of the flutes is larger than the upstream opening. Such filter constructions are described in U.S. patent application Ser. No. 08/639,220, herein incorporated by reference in its entirety. Details about fine fiber and its materials and manufacture is disclosed in U.S. patent application Ser. No. 09/871,583, herein incorporated by reference.

DETAILED DESCRIPTION OF THE DRAWINGS

FIG. 1 is a graphic representation of experimental data comparing the overall filter efficiency of three different structures. A first structure is a commercial filter cartridge. This filter is a cylindrical cartridge made of a pleated substrate formed from a continuous non-woven fabric of treated cellulose and synthetic. The filter is about 675 mm in height and about 325 mm in diameter with media pleats of about 51 mm. This commercial filter, having no fine fiber, is compared to a single sided structure with one layer of fine fiber on a substrate and to a double-sided structure having a layer of fine fiber on both sides of a substrate material. The single sided and double sided layers were constructed similarly to show that a single layer of fine fiber provides a level of filtering efficiency, while a dual layer provides substantially improved filter efficiency. Causing the mobile media to pass through two fine fiber layers, in effect, substantially improves overall filter efficiency. The substrate layer (no fine fiber) showed in the figure has, in virtually all cases, substantially poorer efficiency than either the single or double sided fine fiber layers. The single-sided structure shows a good level of efficiency. The double-sided structure shows the maximum efficiency. In this way, the filter construction can be engineered to have any arbitrary level of filter efficiency by providing two or more layers of fine fiber that provide additive increases in overall efficiency in the filter structure. In this test, the double-sided structure is better than the single sided material by 5 to 10% depending on size. In this test, adding another single layer of fine fiber to the double layer structure could add another 2 to 5% efficiency to a filter with the structure including layers of fiber. By adding another double-layered structure to the tested double layer structure (i.e. four layers of fine fiber) the test would additively increase efficiency by 3 to 10% depending on particle size.

Figure 2:
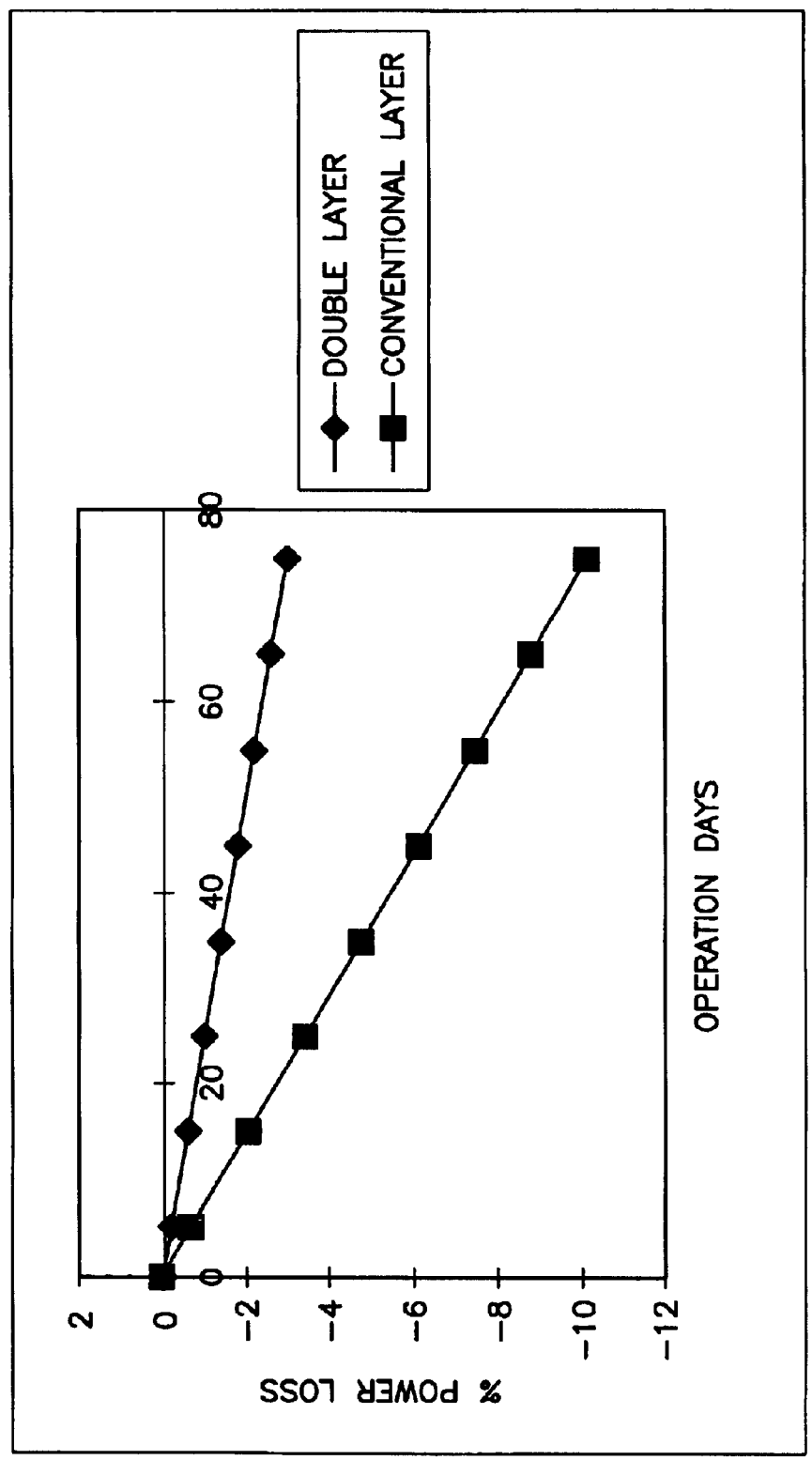
FIG. 2 is a graphical representation of data showing that over a period of 80 days, using the dual sided fine fiber structure of the invention results in a substantially reduced percent power loss in a high power turbojet gas turbine powered system.

FIG. 2 displays operational data of a large, high output, gas turbine power system. The figure shows a power curve derived from a gas turbine engine output using a high efficiency single sided fine fiber layer filter of the invention when compared to a filter having only conventional filter substrates. As can be seen in the figure, over a period of 80 days, the power loss to the gas turbine engine becomes rapidly significant. The power loss is due to degradation of the turbine performance due to contamination of the turbine blades by material passing through the filter, and plugging of the by particulates. The high efficiency fine fiber layer shows less than 2% power loss over a period between 60 and 80 days. The power loss in such an application is a significant operational advantage to the operation of the gas turbine power generating station. This data was obtained by measuring the power output of two identical side-by-side gas turbine engines, one with the conventional filter, one with the high efficiency fine fiber filter.

Figure 3:
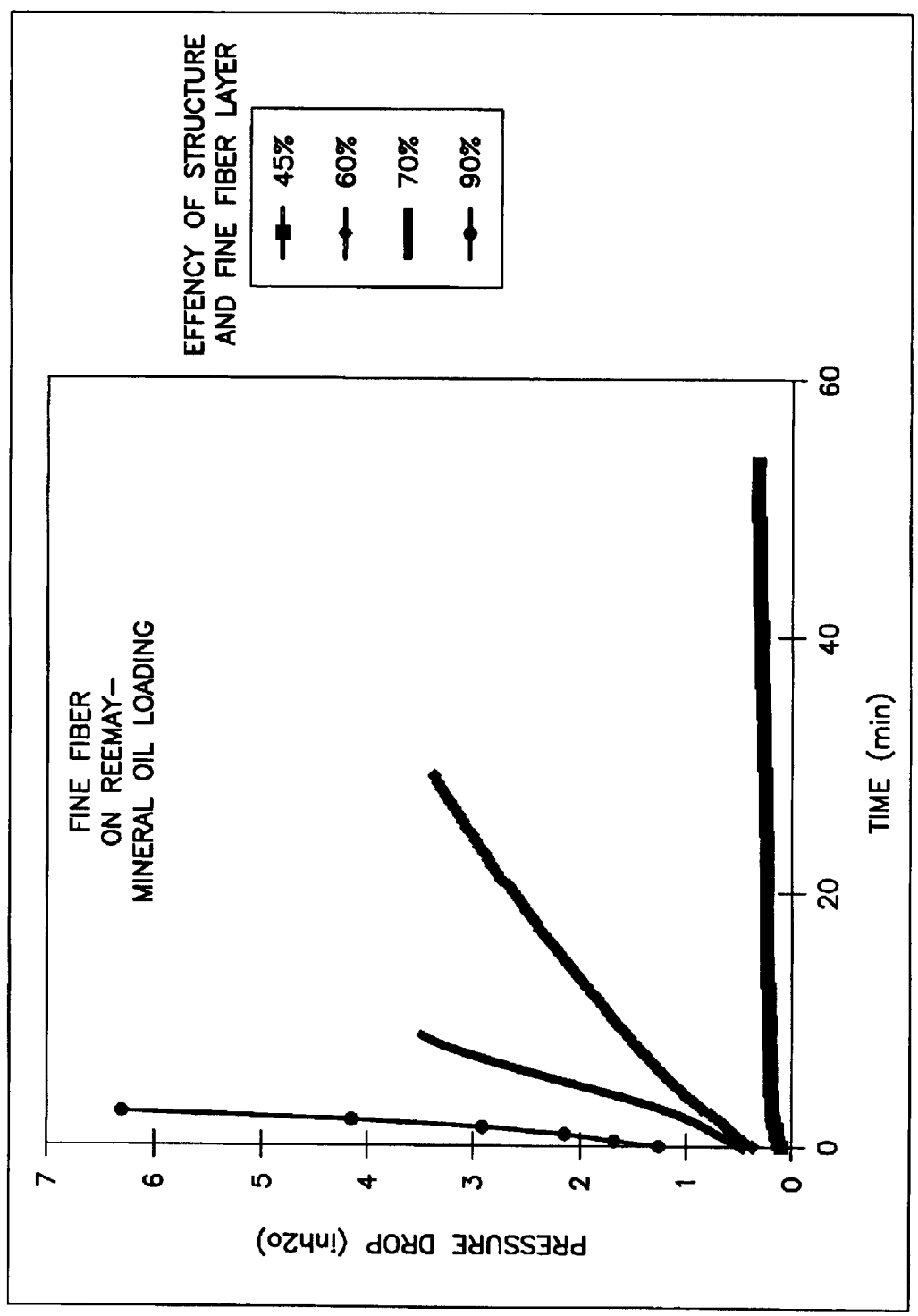
FIG. 3 demonstrates the increase in pressure drop in inches of water caused by forming of a mineral oil film on a fine fiber single sided filter structure. The graph demonstrates that the reduced efficiency filter structure has little or no pressure drop over its tested life while the high efficiency fine fiber layer obtains an extremely high pressure drop within a very short period of time. Using two reduced efficiency layers can maintain low pressure while obtaining a combined filter efficiency.

FIG. 3 shows a set of data demonstrating the increase in pressure drop when various single fine fiber layers on a substrate are exposed to a mineral oil aerosol. We believe that the mineral oil contacts the fine fiber layer and forms an oil film plugging the pores in the fine fiber layer. As the pores are filled, the pressure drop tends to increase. This data shows that a relatively low efficiency fine fiber layer (for example, a 45% efficient fine fiber layer) has little tendency to increase in pressure drop while an increased efficiency fine fiber layer (e.g. 60% efficiency) does substantially increase pressure drop. This data shows that, depending on the tendency of the filter media fluid to plug the fine fiber, reduced efficiency can substantially increase lifetime. This data, taken with the data of FIG. 1, shows that ganged fine fiber layers can provide increased efficiency (additively greater than 90%) while maintaining the low pressure drop increase of low efficiency layers. This is particularly strongly shown by the very rapid increase in the 90% efficient layer which, upon initiation of the mineral oil loading, obtains an unacceptably high pressure drop within a very few minutes of test initiation. Since many filtration structures are made having a designed overall efficiency of 90% or greater, the use of a single high efficient fine fiber layer can cause significant operating problems while an overall 90% efficiency layer can be obtained by using two or more fine fiber layers having substantially reduced efficiency while still avoiding the high pressure drop of a single layer. The test for lifetime or increased pressure drop was done by loading the filter with the recited aerosols. The test for efficiency used was ASTM-1215-89 with monodisperse 0.78 micron polystyrene latex particles at 20 ft/min velocity.

Figure 4:
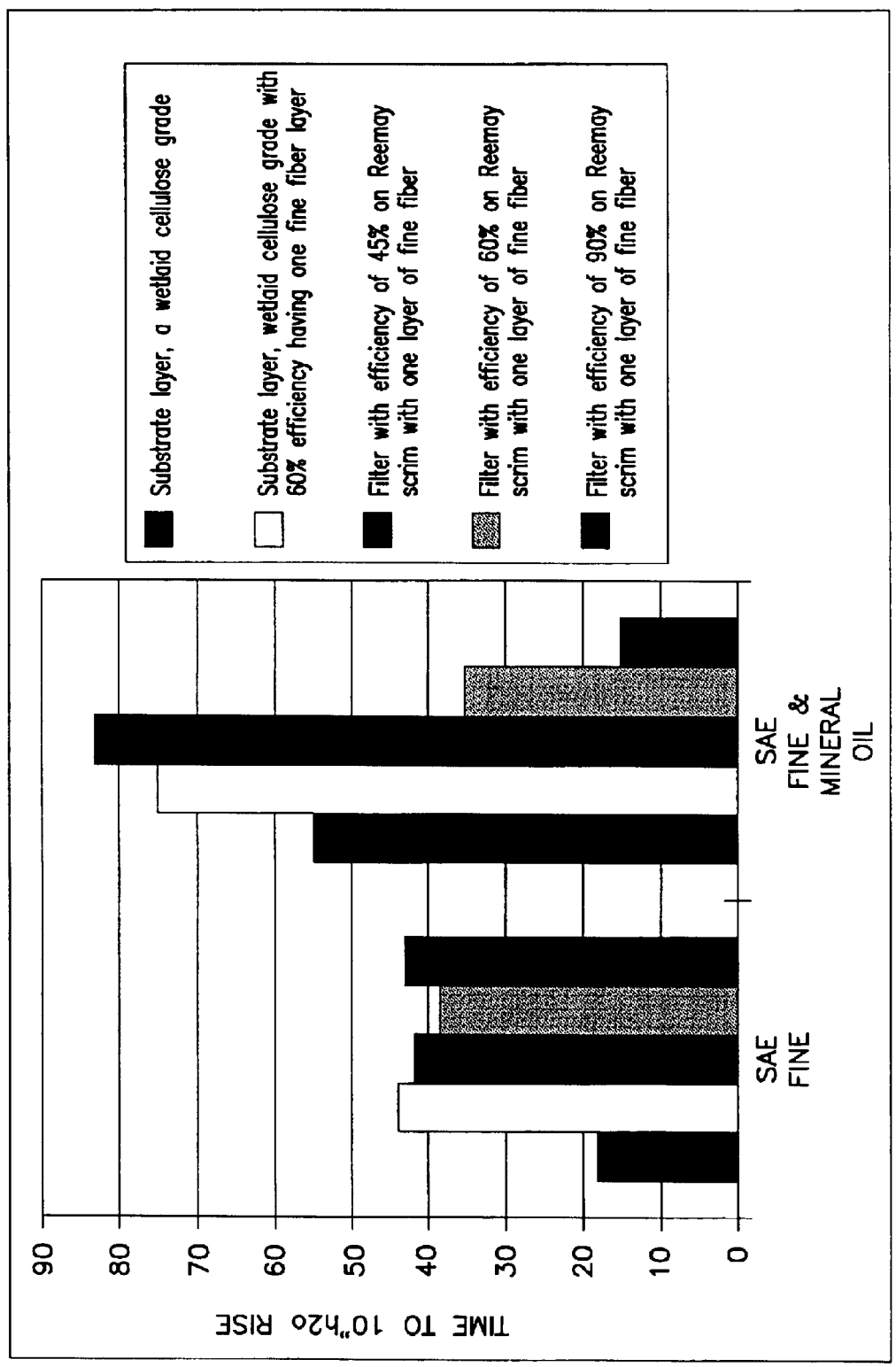
FIG. 4 is a bar chart representation of the time exemplary filter materials to reach a 10 inch water pressure drop. The test particulate used with the filter comprises SAE fine silica or a combination of SAE fine silica and a mineral oil. Under the extreme conditions of combined SAE fine silica and mineral oil, the highly efficient fine fiber layer reaches an unacceptable pressure drop in less than 20 minutes while the less efficient fine fiber layer survives in these difficult test conditions for a significant period of time. In sharp contrast, the fine fiber layer exposed only to a silica particulate maintains an acceptable pressure drop for a significant period of time. The two layer filter can maintain low pressure increase and acceptable efficiency.
Figure 5:
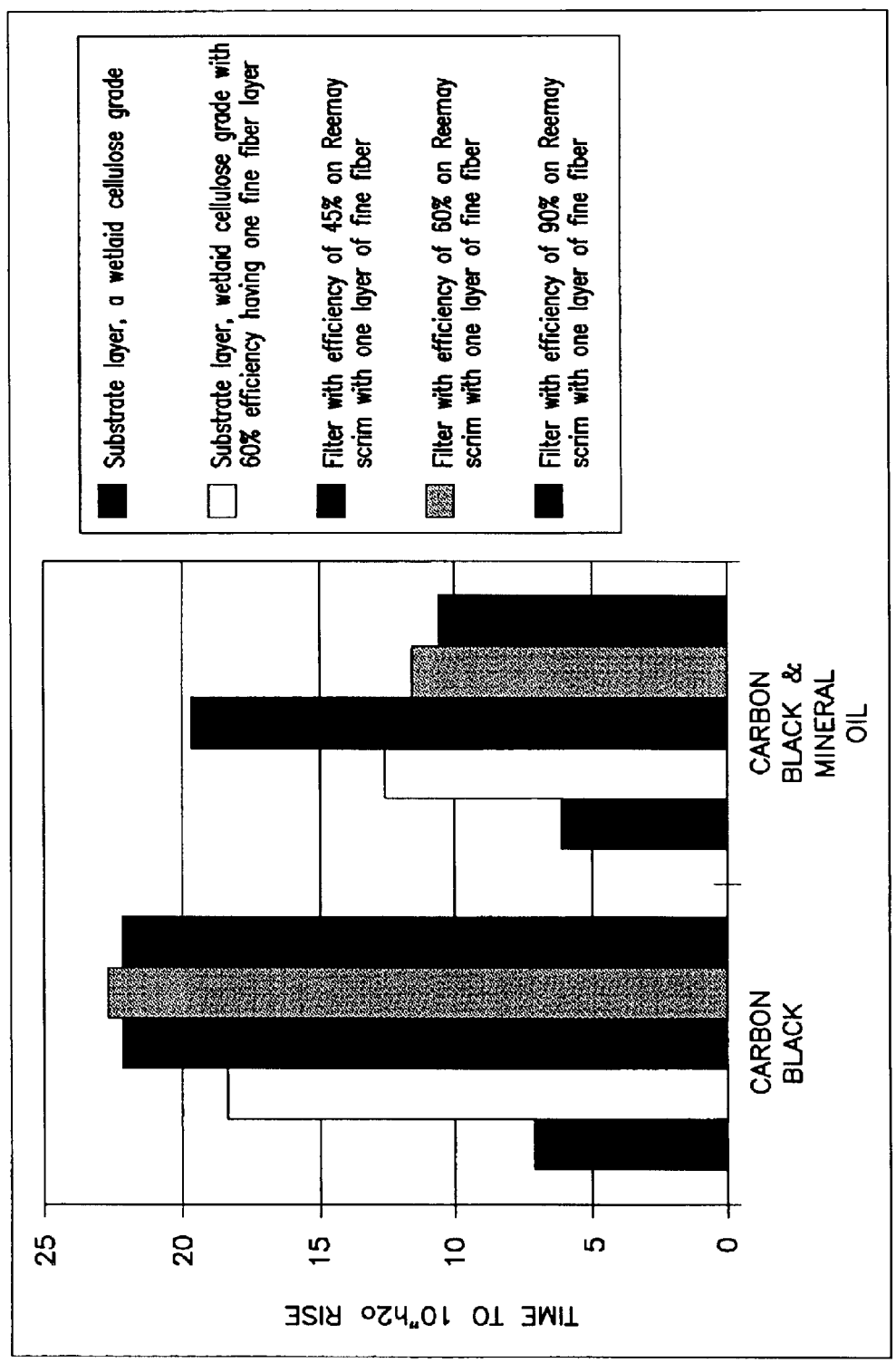
FIG. 5 similarly shows the effect of a carbon black particulate when compared to a combination of carbon black particulate and mineral oil. Clearly, a liquid material that can aid in filming over and plugging the pores in the fine fiber layer significantly reduces lifetime (reaching a high pressure drop).

FIGS. 4 and 5 demonstrate similar efficiency pressure drop tendencies when the structures are exposed to a particulate such as carbon black or SAE fine silica dust and when such a particulate is combined with mineral oil. These data, in particular, show that the addition of mineral oil to the particulate can cause a very rapid pressure increase. Again, using a reduced efficiency (45–60% efficient) layer in two or more separate layers, overall efficiencies can be maintained while pressure drop can be reduced. The test for lifetime or increased pressure drop was done by loading the filter with the recited aerosols. The test for efficiency used was ASTM-1215-89 with monodisperse 0.78 micron polystyrene latex particles at 20 ft/min velocity.

Figure 6:
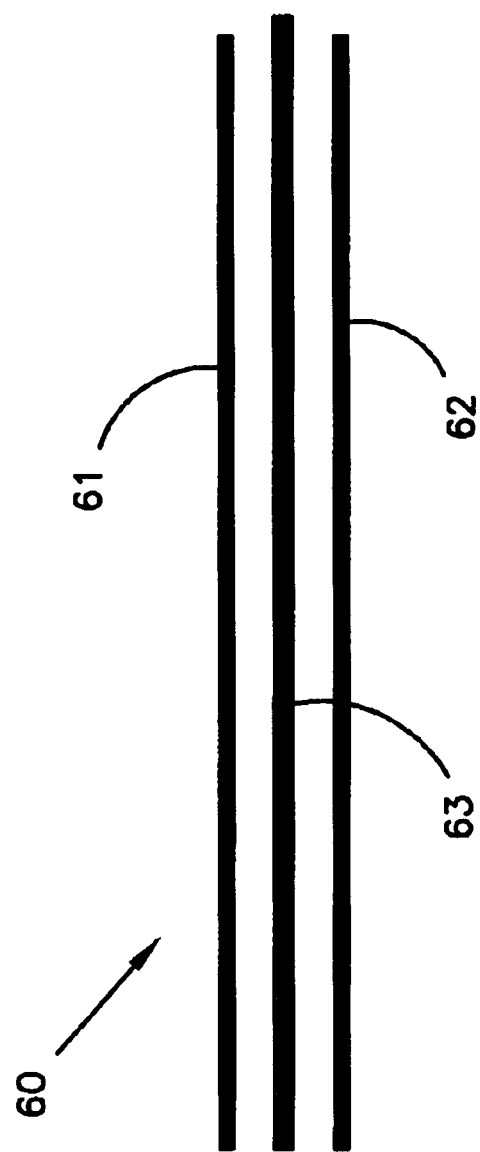
FIG. 6 shows a side view of the structure of the double sided fine fiber of the invention.

FIG. 6 shows an idealized side view of the structure 60 of the double sided fine fiber of the invention. In FIG. 6, the double layered fiber 61, 62 on the substrate 63 in a layered structure is shown. The fine fiber layers 61, 62 are generally thinner than the substrate 63. The fine fiber layers 61, 62 are typically adhered intimately to the substrate 63 leaving no substantial space between the layers.

The mineral oil was 'light' mineral oil with a specific gravity of 0.855 and a viscosity of 27 centistokes at 40 deg C. The carbon black was made by CABOT Corporation and was identified as Vulcan XC 72R GP-3059. Tests were performed at 25 fpm media face velocity. SAE Fine and carbon black were fed using a tray feeder and a Japanese/ISO type deflocculator. The mineral oil was fed using a TSI 3576 atomizer. The compressed air pressure was set at 20 psi for both the deflocculator and the atomizer. For tests with SAE fine dust or carbon black combined with mineral oil, the oil was fed approximately 2 inches downstream from the dust inlet. For SAE fine combined with mineral oil, the mass feed ratio was approximately 5 to 1 respectively. For carbon black combined with mineral oil, the mass feed ratio was approximately 1 to 2 respectively. The test media included:

Substrate layer—a wetlaid cellulose grade

Substrate layer, wet laid cellulosic grade with 60% efficiency having one fine fiber layer Filter with efficiency of 45% on Reemay scrim with one layer of fine fiber Filter with efficiency of 60% on Reemay scrim with one layer of fine fiber Filter with efficiency of 90% on Reemay scrim with one layer of fine fiber Experimental An experiment was conducted to demonstrate that the use of two separate fine fiber layers on a substrate, each layer having a reduced efficiency, could be combined to produce an overall efficiency greater than the efficiencies of the separate fine fiber layers. In this experiment, a substrate having no fiber was compared to a substrate having a single layer of fine fiber. These structures were compared to a third structure having two layers of fine fiber substantially similar to the single layer of fine fiber on the single layer structure. This two layer structure was processed by rewinding and unwinding the dual layer fine fiber to demonstrate the mechanical stability of the fine fiber to typical fine fiber layer manufacturing or process conditions. The layers were made using conventional processing techniques and were tested using.

This is an example of using a substrate with 65% LEFS, adding a fine fiber layer with 66% LEFS (total then 88%), then adding a second layer of fine fiber with 66% LEFS (total then 96%). Substrates with LEFS efficiency of 5% up to 80% can be used. We also may use higher fine fiber efficiency on the downstream side of the filter (since we would have less plugging to worry about). The test for efficiency used was ASTM-1215-89 with monodisperse 0.78 micron polystyrene latex particles at 20 ft/min velocity.

The following table shows the percent overall efficiency of the filter structures. The tests were made by selecting a portion of the filter structure along the width of the sheet like material. A sample was taken at positions 1, 2 and 3 which corresponded to the center of the web (position 2) and a sample taken closer to the edge of the web (positions 1 and 3). The substrate without fine fiber showed an overall efficiency regardless of sample position that is about 65%. The single layer of fine fiber had an efficiency that ranged from about 86 to about 89%, these measurements appear to be within the experimental variation.

TABLE 1

| TEST PRODUCT | SAMPLE POSITION - Percent (%) Overall Efficiency | | |
|---|---|---|---|
| | 1 | 2 | 3 |
| Substrate (No Fiber) | 65 | 65 | 65 |
| Single Layer Fine Fiber | 88 | 86 | 89 |
| Dual Layer Fine Fiber | 96 | 95 | 98 |
| Rewound Dual Layer | 94 | 96 | 97 |

The dual layer of fine fiber having additive efficiency increase from two layers of fine fiber range from about 95 to about 98% efficient. The overall efficiency of the fine fiber layers that are rewound to duplicate manufacturing conditions showed no substantial reduction of the overall efficiency of the filter structure.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A fine fiber filter media comprising a single layer of filter substrate, the substrate having a first surface and a second surface, the substrate having a permeability of about 0.03 to 15 m-sec$^{-1}$ and an efficiency greater than 10%, the first surface and the second surface each comprising a layer of fine fiber having a diameter of about 0.001 to 0.5 microns, the layer of fine fiber having a thickness of less than 5 microns, the layer of fine fiber formed in an amount effective to obtain a pore size of about 0.0001 to 5 microns, an overall efficiency under ASTM-1215-89 with monodisperse 0.78 micron polystyrene latex particles at 20 ft/min velocity of about 50% to 90% in any one layer and to obtain an efficiency of greater than 90% in the layers combined.

2. The filter media of claim 1 wherein the efficiency of the substrate is greater than 20% and the efficiency of the fine fiber layer on the first surface is different than the efficiency of the fine fiber layer on to second surface.

3. The filter media of claim 1 wherein the efficiency of the substrate is greater than 20% and the efficiency of the fine fiber layer on a downstream surface is greater than the efficiency of the tine fiber layer on an upstream surface.

4. The filter media of claim 1 wherein the fine fiber layer formed in an amount effective, in each layer, to obtain an efficiency of less than 85% and in both layers combined to obtain an overall efficiency of greater than 90% and the substrate has an efficiency of about 10% to about 80%.

5. The filter media of claim 1 wherein the fine fiber layer formed in an amount effective, in each layer, to obtain an efficiency of less than 80% and in both layers combined to obtain an overall efficiency of greater than 85% and the substrate has an efficiency of about 20% to about 80%.

6. The filter media of claim 1 wherein the fine fiber layer formed in an amount effective, in each layer, to obtain an efficiency of about 40% to 85% and in both layers combined to obtain an overall efficiency of greater than 65% and the substrate has an efficiency of about 10% to about 80%.

7. The filter media of claim 1 wherein the fine fiber layer formed in an amount effective, in each layer, to obtain an efficiency of about 40% to 80% and in both layers combined to obtain an overall efficiency of greater than 65% and the substrate has an efficiency of about 20% to about 80%.

8. The filter media of claim 1 wherein the tine fiber layer formed in an amount effective, in each layer, to obtain an overall efficiency of less than 75% and in both layers combined to obtain an efficiency of greater than 80%, and retains greater than 30% of the fiber unchanged for filtration purposes.

9. The filter media of claim 1 wherein the fine fiber forming an interlocking mesh of fiber having on the average a pore size between fibers in the web of less than about 3 microns; wherein the filter media has an efficiency greater than the efficiency of a single sided media and has a lifetime, defined as an increase in pressure drop over the filter of about 3 inches $H_2O$ at test conditions of 10 ft/min.

10. A method of removing a particulate from an air borne stream, the particulate comprising a liquid particulate, a solid particulate or mixtures thereof, the method comprises:
    (a) placing a filter structure in an air stream having a particulate; and
    (b) directing the air stream through the filter structure while monitoring the useful life of the filter structure; said filter structure comprising a fine fiber filter media and single layer of a filter substrate the substrate having a permeability of about 0.03 to 15 m-sec$^{-1}$ and an efficiency of greater than 10%, the substrate having a first surface and a second surface, the first surface and the second surface each comprising a layer of fine fiber having a diameter of about 0.001 to 0.5 microns, the layer of fine fiber having a thickness of less than 5 micron, the fine fiber layer formed in an amount affective to obtain a pore size of about 0.001 to 5 microns, an efficiency under ASTM-1215-89 with monodisperse 0.78 micron polystyrene latex particles at 20 ft/min velocity of about 50% to 90% in any one layer and to obtain an efficiency of greater than 90% in the layers combined.

11. The method of claim 10 wherein the efficiency of the substrate is greater than 20% and the efficiency of the fine fiber layer on the first surface is different than the efficiency of the fine fiber layer on the second surface.

12. The method of claim 10 wherein the efficiency of the substrate is greater than 20% and the efficiency of the fine fiber layer on a downstream surface is greater than the efficiency of the fine fiber layer on an upstream surface.

13. The method of claim 10 wherein the fine fiber layer formed in an amount effective to obtain an efficiency of less than 85% in any one layer and to obtain an efficiency of greater than 90% in both layers combined.

14. The method of claim 10 wherein the fine fiber layer formed in an amount effective to obtain an efficiency of less than 80% in any one layer and to obtain an efficiency of greater than 85% in both layers combined.

15. The method of claim 10 wherein the fine fiber layer formed in an amount effective, in each layer, to obtain an efficiency of about 40% to 85% and in both layers combined to obtain an overall efficiency of greater than 65% and the substrate has an efficiency of about 10% to about 80%.

16. The method of claim 10 wherein the fine fiber layer formed in an amount effective, in each layer, to obtain an efficiency of about 40% to 80% and in both layers combined to obtain an overall efficiency of greater than 65% and the substrate has an efficiency of about 20% to about 80%.

17. The method of claim 10 wherein the fine fiber layer formed in an amount effective to obtain an efficiency of less than 75% in any one layer and to obtain an efficiency of greater than 80% in both layers combined.

18. The method of claim 10 wherein the fine fiber forming an interlocking mesh of fiber having on the average a pore size between fibers in the web of less than about 3 microns; wherein the filter media has an efficiency greater than the efficiency of a single sided media and has a lifetime, defined as an increase in pressure drop over the filter of about 3 inches $H_2O$ at tout conditions of 10 ft/min.

19. The method of claim 10 wherein the particulate comprises residual components of combustion.

20. The method of claim 10 wherein the particulate comprises a fatty oil, a fatty acid or mixtures thereof.

21. The method of claim 10 wherein the particulate comprises soot, a grit or mixtures thereof.

22. A filter structure consisting essentially of one layer of filter substrate and three or more layers of fine fiber, the substrate layer having a first surface and a second surface, the substrate having a permeability of about 0.03 to 15 m-sec$^{-1}$ and an efficiency of greater than 5%, the surfaces comprising three or more layers of the fine fiber on the substrate, each fine fiber layer comprising fine fiber having a diameter of about 0.01 to 0.5 micron, each fine fiber layer having a thickness of less than 5 microns, the fine fiber layer formed in the amount effective to obtain a pore size of about 0.0001 to 5 microns, an efficiency under ASTM 1215-89 with monodisperse 0.78 micron polystyrene latex particles at 20 ft/min velocity of about 50% to 90% in any one layer and to obtain an overall efficiency of greater than 90% in the layers combined.

23. The filter media of claim 22 wherein the efficiency of the substrate is greater than 20% and the efficiency of one fine fiber layer in the filter structure is different than the efficiency of any other fine fiber layer in the filter structure.

24. The filter media of claim 22 wherein the efficiency of the substrate is greater than 20% and the efficiency of a fine fiber layer on a downstream surface is greater than the efficiency of a fine fiber layer on an upstream surface.

25. The filter media of claim 22 wherein the sheet-like filter substrata has a thickness of about 0.3 to 1 millimeters.

26. The filter media of claim 22 wherein each fine fiber layer is formed in an amount effective to obtain an efficiency of less than 85% and in all layers combined to obtain an overall efficiency of greater than 90%.

27. The fitter media of claim 22 wherein each fine fiber layer is formed in an amount effective to obtain an efficiency of less than 80% and in all layers combined to obtain an overall efficiency of greater than 85%.

28. The filter media of claim 22 wherein each fine fiber layer is formed in an amount effective to obtain an efficiency of about 40% to 85% and in all layers combined to obtain an overall efficiency of greater than 65% and the substrate has an efficiency of about 5% to about 80%.

29. The filter media of claim 22 wherein each fine fiber layer is formed in an amount effective to obtain an efficiency of about 40% to 80% and in all layers combined to obtain an overall efficiency of greater than 65% and the substrate has an efficiency of about 20% to about 80%.

30. The filter media of claim 22 wherein each fine fiber layer is formed in an amount effective to obtain an overall efficiency of loan than 75% and in all layers combined to obtain an efficiency of greater than 80%, and retains greater than 30% of the fiber unchanged for filtration purposes.

31. The filter media of claim 22 wherein the fine fiber forming an interlocking mesh of fiber having on the average a pore size between fibers in the web of less than about 3 microns; wherein the filter media has an efficiency greater than the efficiency of single sided media and has a lifetime, defined as an increase in pressure drop over the filter of about 3 inches $H_2O$ at test conditions of 10 ft/min.

32. A fine fiber filter media consisting essentially of a single layer of filter substrate, the substrate having a first surface and a second surface, the substrate having a permeability of about 0.03 to 15 m-sec$^{-1}$ and an efficiency greater than 20%, the first surface and the second surface each comprising a layer of fine fiber having a diameter of about 0.001 to 0.5 microns, the layer of fine fiber having a thickness of less than 5 microns, the layer of fine fiber formed in an amount effective to obtain a pore size of about 0.0001 to 5 microns, an overall efficiency under ASTM-1215-89 with monodisperse 0.78 micron polystyrene latex particles at 20 ft/min velocity of about 50% to 90% in any one layer and to obtain an efficiency of greater than 90% in the layers combined.

33. The filter media of claim 32 wherein the efficiency of the fine fiber layer on the first surface is different than the efficiency of the fine fiber layer on the second surface.

34. The filter media of claim 32 wherein the efficiency of the fine fiber layer on a downstream surface is greater than the efficiency of the fine fiber layer on an upstream surface.

35. The filter media of claim 32 wherein the sheet-like filter substrate has a thickness of about 0.1 to 3 millimeters, the first surface and the second surface each comprising a layer of fine fiber having a diameter of stout 0.01 to 0.3 microns the layer having a thickness of less than 3 microns, the fine fiber selected such that after test exposure for a test period of 16 hours to test conditions of 140° F. air and a relative humidity of 100% retains greater than 50% of the fiber unchanged for filtration purposes.

36. The filter media of claim 32 wherein the fine fiber layer formed in an amount effective, in each layer, to obtain an efficiency of less than 85% and in both layers combined to obtain an overall efficiency of greater than 90% and the substrate has an efficiency of about 10% to about 80%.

37. The filter media of claim 32 wherein the fine fiber layer formed in an amount effective, in each layer, to obtain an efficiency often than 80% and in both layers combined to obtain an overall efficiency of greater than 85% and the substrate has an efficiency of about 20% to about 80%.

38. The filter media of claim 32 wherein the fine fiber layer formed in an amount effective, in each layer, to obtain an efficiency of about 40% to 85% and in both layers combined to obtain an overall efficiency of greater than 65% and the substrate has an efficiency of about 10% to about 80%.

39. The filter media of claim 32 wherein the fine fiber layer fanned in an amount effective, in each layer, to obtain an efficiency of about 40% to 80% and in both layers combined to obtain an overall efficiency of greater than 65% and the substrate has an efficiency of about 20% to about 80%.

40. The filter media of claim 36 wherein the fine fiber layer formed in an amount effective, in each layer, to obtain an overall efficiency of less than 75% and in both layers combined to obtain an efficiency of greater than 80%, and retains greater than 30% of the fiber unchanged for filtration purposes.

41. The filter media of claim 32 wherein the fine fiber forming an interlocking mesh of fiber having on the average a pore size between fibers in the web of less than about 3 microns; wherein the filter media has an efficiency greater than the efficiency of a single sided media and has a lifetime, defined as an increase in pressure drop over the filter of about 3 inches $H_2O$ at test conditions of 10 ft/min.

* * * * *

UNITED STATES PATENT AND TRADEMARK OFFICE
CERTIFICATE OF CORRECTION

PATENT NO. : 6,746,517 B2  
DATED : June 8, 2004  
INVENTOR(S) : Benson et al.

Page 1 of 1

It is certified that error appears in the above-identified patent and that said Letters Patent is hereby corrected as shown below:

Column 21,  
Line 52, "affective to obtain" should read -- effective to obtain --

Column 22,  
Line 26 "at tout conditions" should read -- at test conditions --  
Line 62, "The fitter media" should read -- The filter media --

Column 23,  
Line 11, "of loan than" should read -- of less than --

Column 24,  
Line 1 "of stout 0.01" should read -- of about 0.01 --  
Line 24, "layer fanned in" should read -- layer formed in --

Signed and Sealed this

Twenty-third Day of November, 2004

JON W. DUDAS  
*Director of the United States Patent and Trademark Office*